United States Patent
Matsumoto et al.

(10) Patent No.: US 6,764,098 B2
(45) Date of Patent: Jul. 20, 2004

(54) SUPPORT MECHANISM OF STEERING SYSTEM

(75) Inventors: Shin Matsumoto, Toyota (JP); Mayumi Kamoshita, Nisshin (JP); Sadato Kita, Toyota (JP); Kiminori Yoshino, Nishikamo-gun (JP); Hideo Kondo, Aichi-gun (JP); Junichi Nakano, Toyota (JP); Hitoshi Araki, Nishikamo-gun (JP); Shigeru Hoshino, Toyota (JP); Kenji Imamura, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 55 days.

(21) Appl. No.: 10/107,580

(22) Filed: Mar. 28, 2002

(65) Prior Publication Data
US 2002/0167157 A1 Nov. 14, 2002

(30) Foreign Application Priority Data

| Apr. 3, 2001 | (JP) | 2001-104359 |
| Apr. 3, 2001 | (JP) | 2001-104366 |
| Dec. 26, 2001 | (JP) | 2001-393452 |

(51) Int. Cl.$^7$ .............. B62O 1/11; B62O 1/19
(52) U.S. Cl. ................ 280/777; 188/374
(58) Field of Search ............... 280/777; 180/268; 188/374, 375

(56) References Cited

U.S. PATENT DOCUMENTS

| 3,392,599 A | * | 7/1968 | White | 74/492 |
| 3,768,824 A | * | 10/1973 | Kloppe et al. | 280/731 |
| 4,978,138 A | * | 12/1990 | Hikone et al. | 280/777 |
| 6,170,874 B1 | | 1/2001 | Fosse | 280/777 |
| 6,234,528 B1 | | 5/2001 | Ben-Rhouma et al. | 280/777 |
| 6,241,284 B1 | * | 6/2001 | De Verdier et al. | 280/777 |
| 6,283,508 B1 | * | 9/2001 | Nouwynck et al. | 280/753 |
| 6,322,103 B1 | | 11/2001 | Li et al. | 280/777 |
| 6,367,840 B1 | * | 4/2002 | Duval et al. | 280/777 |
| 6,478,333 B1 | | 11/2002 | Barton et al. | |

FOREIGN PATENT DOCUMENTS

| DE | 4013695 C | * | 9/1991 | ......... B60R/21/02 |
| DE | 100 25 981 A1 | | 12/2000 | |
| EP | 1 018 463 A1 | | 7/2000 | |
| JP | A 4-113954 | | 4/1992 | |
| JP | Y2 7-47253 | | 11/1995 | |
| JP | A 2000-351377 | | 12/2000 | |
| JP | A 2000-355277 | | 12/2000 | |
| WO | WO 98/58831 | | 12/1998 | |
| WO | WO 00/76833 A1 | | 12/2000 | |

* cited by examiner

*Primary Examiner*—Paul N. Dickson
*Assistant Examiner*—Laura B. Rosenberg
(74) *Attorney, Agent, or Firm*—Oliff & Berridge, PLC

(57) ABSTRACT

A support mechanism of a steering system that supports a steering column to a part of a vehicle body includes an energy absorbing member mounted on the side of a steering column or the vehicle body, a support pin mounted on the side of the vehicle body or the steering column, that deforms the energy absorbing member when the steering column moves relative to the vehicle body, and an actuator mounted on the side of the steering column or the vehicle body, that changes deformation characteristics of the energy absorbing member.

14 Claims, 27 Drawing Sheets

SUPPORT MECHANISM OF STEERING SYSTEM

The disclosures of Japanese Patent Applications Nos. 2001-104359 filed on Apr. 3, 2001, 2001–104366 filed on Apr. 3, 2001 and 2001-393452 filed on Dec. 26, 2001, each including the specification, drawings and abstract, are incorporated herein by reference in their entireties.

BACKGROUND OF THE INVENTION

1. Field of Invention

The invention relates to a support mechanism of an automobile steering system.

2. Description of Related Art

Many automobile steering systems include an airbag in a steering wheel to absorb the impact force of a steering wheel against the driver upon a head-on collision of a vehicle. However, some automobile steering systems include an energy absorbing mechanism in a support mechanism of the steering system to absorb the impact force transmitted to the steering wheel. Other automobile steering systems include both an airbag and an energy absorbing mechanism.

The steering system disclosed in Japanese Patent Application No. 4-113954 not only absorbs the impact force of an airbag mounted in a steering wheel against the driver but also withdraws a steering column toward the front of the vehicle according to whether the driver fastens a seatbelt. This steering system thus maintains an appropriate distance between the steering wheel and the driver, thereby further reducing the impact force.

In order for the airbag to cooperate with a column moving mechanism, the above steering system includes various members for establishing a cooperative state between the airbag and the column moving mechanism, and a controller for controlling the cooperative relation therebetween. Therefore, in the above steering system, various constituent members are arranged around the steering column to allow the airbag and the column moving mechanism to cooperate with each other. This complicates the structure of the steering system and also significantly increases the costs. Moreover, for the above steering system, sufficient consideration have not been given regarding how the energy absorption amount of the support mechanism of the steering system is set according to whether the driver fastens a seatbelt and the seated position of the driver.

SUMMARY OF THE INVENTION

The invention thus provides a simplified support mechanism of a steering system that is capable of absorbing a different amount of impact energy according to whether the driver fastens the seatbelt and the seated position of the driver, and that does not cooperate with an airbag mounted in a steering wheel.

A first aspect of the invention relates to a support mechanism of a steering system, and more particularly, relates to a support mechanism of a steering system that is supports a steering column to a port of a vehicle body. The steering column that supports a steering shaft so that the steering shaft is rotatable in a circumferential direction. Basically, the support mechanism according to the first aspect of the invention includes an energy absorbing mechanism mounted in the support portion on a side of at least one of the steering column and the vehicle body, and capable of changing an energy absorption amount. The support mechanism reduces the energy absorption amount of the energy absorbing mechanism when a driver fastens a seatbelt and increases the energy absorption amount of the energy absorbing mechanism when the driver does not fasten the seatbelt.

In the support mechanism of the steering system according to the first aspect of the invention (first support mechanism), the energy absorbing mechanism may include a support member fixed to the steering column, a support pin extending through a longitudinal long hole in the support member, and attached to a part of the vehicle body to support the steering column to the vehicle body through the support member, an energy absorbing member mounted in the support member, and capable of being deformed by the support pin when the support pin moves relative to the long hole within the long hole, and an actuator that changes an amount of a deforming action on the energy absorbing member according to whether the driver fastens the seatbelt. The actuator reduces the amount of the deforming action on the energy absorbing member when the driver fastens the seatbelt, and increases the amount of the deforming action on the energy absorbing member when the driver does not fasten the seatbelt.

In the support mechanism according to the first aspect of the invention (second support mechanism), the energy absorbing mechanism may include an energy absorbing member mounted on a side of the vehicle body, and moving relative to the steering column in a longitudinal direction of the steering column, a deforming member mounted on a side of the steering column, that deforms the energy absorbing member while the deforming member is moving relative to the energy absorbing member, and an actuator that changes the amount of the deforming action of the deforming member on the energy absorbing member according to whether the driver fastens the seatbelt. The actuator reduces the amount of the deforming action on the energy absorbing member when the driver fastens the seatbelt, and increases the amount of the deforming action on the energy absorbing member when the driver does not fasten the seatbelt.

In the support member according to the first aspect of the invention (third support mechanism), the energy absorbing mechanism may include a support member fixed to the steering column, a support pin extending through a longitudinal long hole in the support member, and attached to a part of the vehicle body to support the steering column to the vehicle body through the support member, and first and second energy absorbing members mounted in the support member, and capable of being deformed by the support pin when the support pin moves relative to the long hole within the long hole. The support pin deforms the first energy absorbing member when the driver fastens the seatbelt, and deforms the first and second energy absorbing members simultaneously when the driver does not fasten the seatbelt.

A second aspect of the invention relates to a support mechanism of a steering system that supports to a steering column to a part of a part of a vehicle body. The steering column supports a steering shaft so that the steering shaft is rotatable in a circumferential direction. This support mechanism includes an energy absorbing mechanism mounted in the support portion on a side of at least one of the steering column and the vehicle body, and capable of changing an energy absorption amount. Provided that a driver does not fasten a seatbelt, the energy absorbing mechanism absorbs a larger amount of energy in the case where a seated position of the driver is ahead of a preset position as compared to the case where the seated position of the driver is in the preset position.

In the support mechanism according to the second aspect of the invention, the energy absorbing mechanism may include a support member fixed to the steering column, a support pin extending through a longitudinal long hole in the support member, and attached to a part of the vehicle body to support the steering column to the vehicle body through the support member, an energy absorbing member mounted in the support member, and capable of being deformed by the support pin when the support pin moves relative to the long hole within the long hole, and an actuator that changes an amount of a deforming action on the energy absorbing member. The actuator reduces the amount of the deforming action on the energy absorbing member when the seated position of the driver is in the preset position, and increases the amount of the deforming action on the energy absorbing member when the seated position of the driver is ahead of the preset position.

In the support mechanism according to the second aspect of the invention, the energy absorbing mechanism may include an energy absorbing member mounted on a side of the vehicle body, and moving relative to the steering column in a longitudinal direction of the steering column, a deforming member mounted on a side of the steering column, that deforms the energy absorbing member while the energy absorbing member is moving, and an actuator that changes an amount of a deforming action of the deforming member on the energy absorbing member according to the seated position of the driver. The actuator reduces the amount of the deforming action on the energy absorbing member when the seated position of the driver is in the preset position, and increases the amount of the deforming action on the energy absorbing member when the seated position of the driver is ahead of the preset position.

In the support mechanism according to the second aspect of the invention, the energy absorbing mechanism may include a support member fixed to the steering column, a support pin extending through a longitudinal long hole in the support member, and attached to a part of the vehicle body to support the steering column to the vehicle body through the support member, and first and second energy absorbing members mounted in the support member, and capable of being deformed by the support pin when the support pin moves relative to the long hole within the long hole. The support pin deforms the first energy absorbing member when the seated position of the driver is in the preset position, and deforms the first and second energy absorbing members simultaneously when the seated position of the driver is ahead of the preset position.

In the steering system supported by the first support mechanism of the first exemplary aspect of the invention, the driver may move forward and interfere with a steering wheel to move the steering column forward upon head-on collision of the vehicle. In this case, the support pin supporting the steering column moves backward within the long hole of the support member with a force corresponding to the impact force. While moving, the support pin deforms the energy absorbing member to absorb the impact energy in the energy absorbing member, thereby reducing the impact force of the steering wheel against the driver.

In this case, when the driver does not fasten the seatbelt, the actuator increases the amount of the deforming action on the energy absorbing member. The energy absorbing member thus absorbs a large amount of energy. On the other hand, when the driver fastens the seatbelt, the actuator reduces the amount of the deforming action on the energy absorbing member. The energy absorbing member thus absorbs a smaller amount of energy as compared to the case where the driver does not fasten the seatbelt.

In the steering system supported by the second support mechanism of the first exemplary aspect of the invention as well, the driver may move forward and interfere with a steering wheel to move the steering column forward upon head-on collision of the vehicle. In this case, the deforming member mounted on the side of the steering column moves relative to the energy absorbing member mounted on the side of the vehicle body. While moving, the deforming member pin deforms the energy absorbing member to absorb the impact energy in the energy absorbing member, thereby reducing the impact force of the steering wheel against the driver.

In this case, when the driver does not fasten the seatbelt, the actuator increases the amount of the deforming action on the energy absorbing member. The energy absorbing member thus absorbs a large amount of energy. On the other hand, when the driver fastens the seatbelt, the actuator reduces the amount of the deforming action on the energy absorbing member. The energy absorbing member thus absorbs a smaller amount of energy as compared to the case where the driver does not fasten the seatbelt.

In the steering system supported by the third support mechanism of the first exemplary aspect of the invention as well, the driver may move forward and interfere with a steering wheel to move the steering column forward upon head-on collision of the vehicle. In this case, the support pin supporting the steering column moves backward within the long hole of the support member with a force corresponding to the impact force. While moving, the support pin deforms the first energy absorbing member to absorb the impact energy in the first energy absorbing member, thereby reducing the impact force of the steering wheel against the driver.

In this case, when the driver does not fasten the seatbelt, one end of the second energy absorbing member is fixed to the support member. Therefore, the support pin deforms the second energy absorbing member simultaneously with the first energy absorbing member. As a result, a large amount of energy is absorbed. On the other hand, when the driver fastens the seatbelt, the second energy absorbing member is not fixed to the support member. Therefore, the support pin does not deform the second energy absorbing member. As a result, a smaller amount of energy is absorbed as compared to the case where the driver does not fasten the seatbelt.

The first, second and third support mechanisms of the first exemplary aspect of the invention are thus capable of changing the absorption amount of impact energy according to whether the driver fastens the seatbelt. The above support mechanisms make good use of the structure of a support mechanism that is essential for supporting the steering system to a part of the vehicle body. Accordingly, the above support mechanisms can be inexpensively manufactured with a relatively simple structure without complicating the structure of the steering system. As a result, significant increase in costs can be suppressed.

When the driver does not fasten the seatbelt and the seated position of the driver is the preset position, the support mechanism of the steering system of the second aspect of the invention provides the same effect as that provided by the above support mechanism of the first exemplary aspect when the driver fastens the seatbelt (i.e., the support mechanism absorbs a small amount of impact energy). When the driver does not fasten the seatbelt and the seated position of the driver is ahead of the preset position, the support mechanism of the steering system of the second exemplary aspect of the invention provides the same effect as that provided by the above support mechanism of the first exemplary aspect when the driver does not fasten the seatbelt (i.e., the support mechanism absorbs a large amount of impact energy).

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
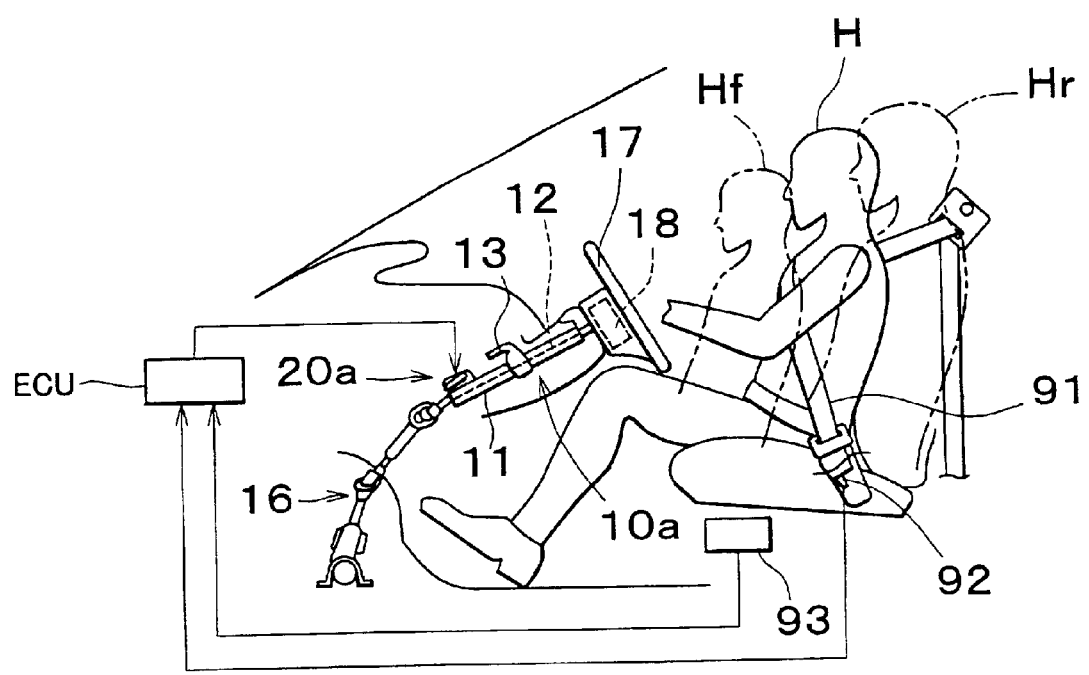
FIG. 1 is a schematic side view of a driver's seat including a steering system having a support mechanism of a first exemplary embodiment of the invention mounted thereon.
Figure 2:
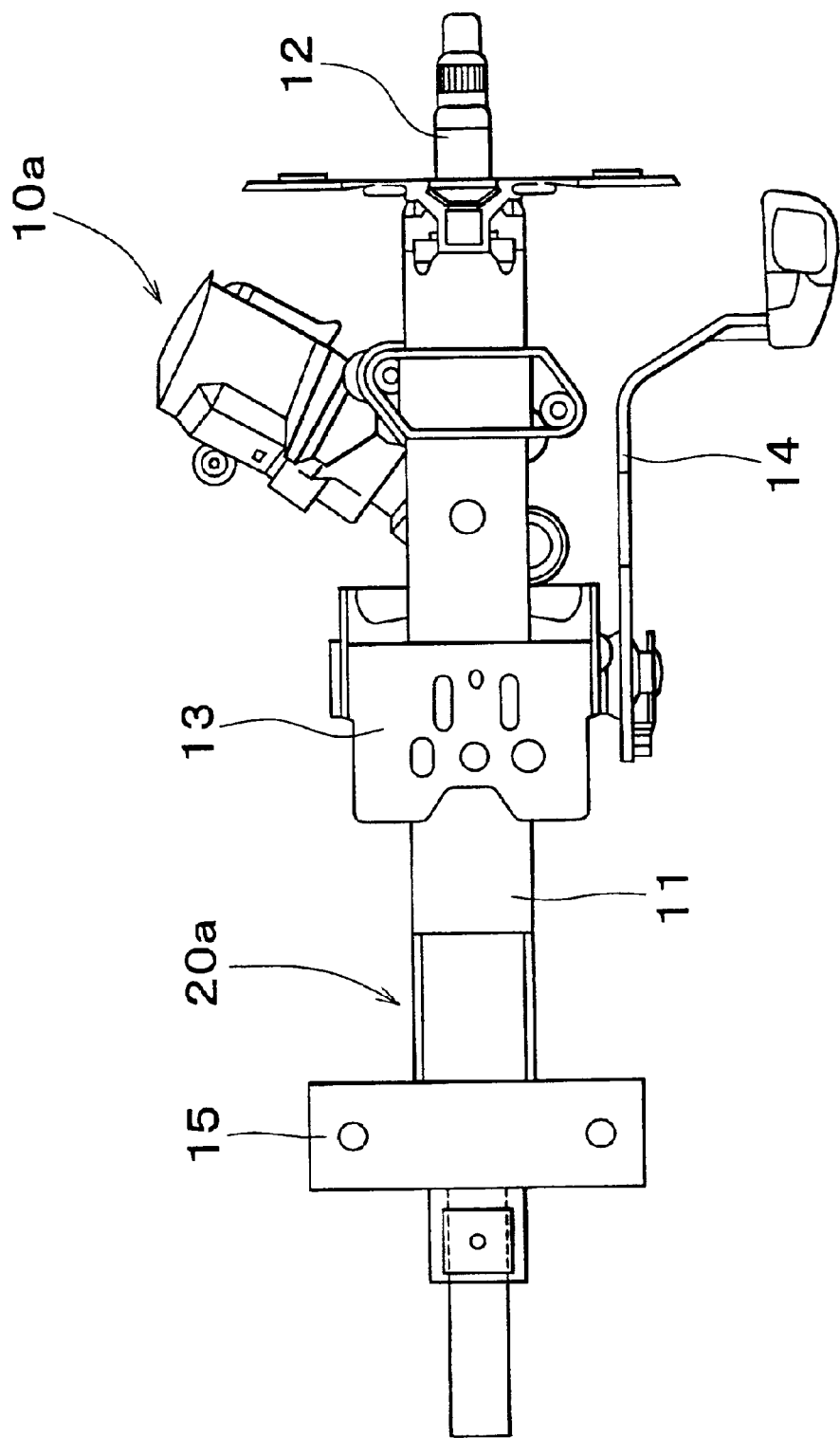
FIG. 2 is a plan view of the steering system having the support mechanism of the first exemplary embodiment mounted thereon.
Figure 3:
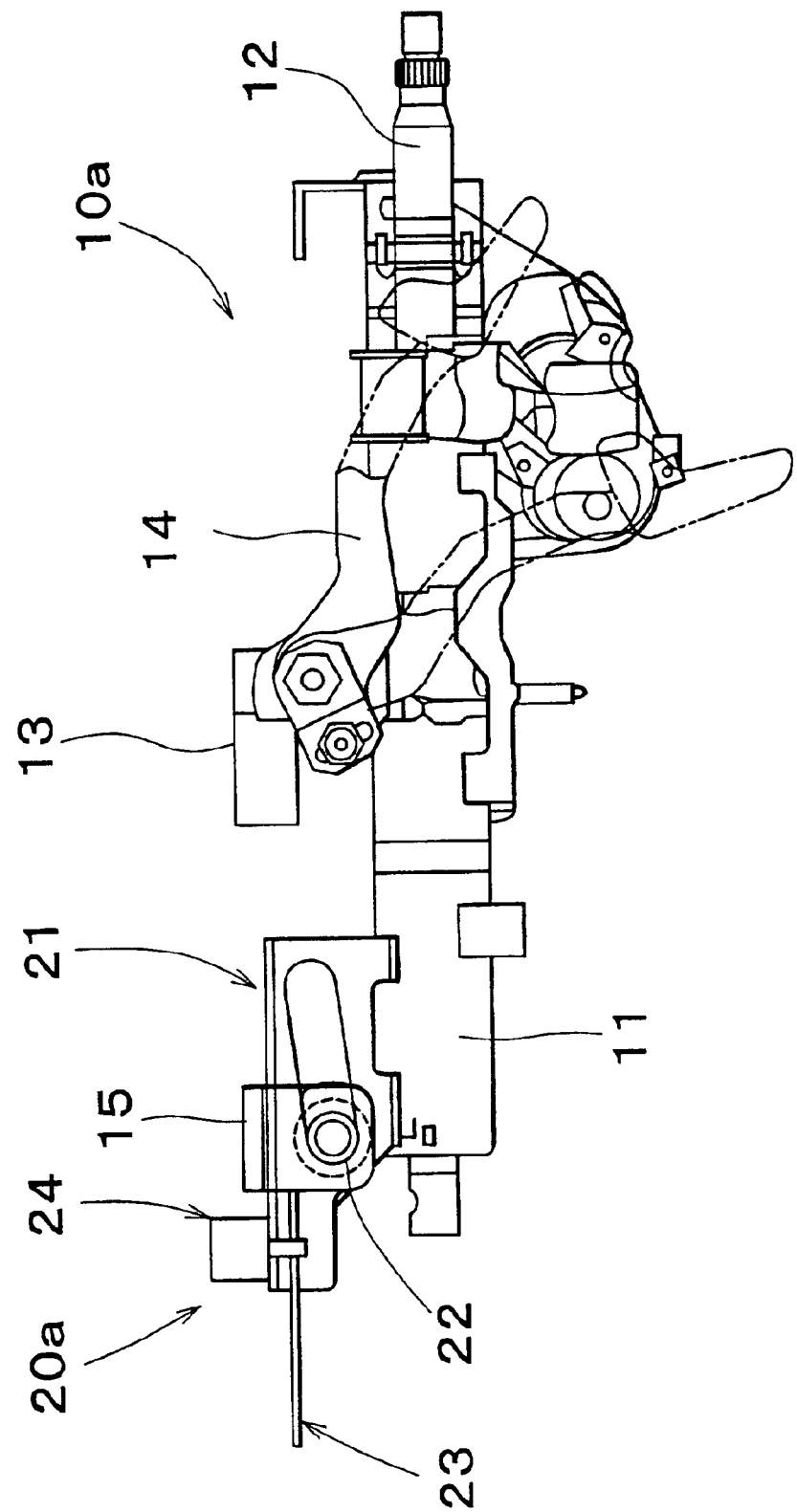
FIG. 3 is a side view of the steering system.

Hereinafter, exemplary embodiments of the invention will be described in conjunction with the accompanying drawings. FIGS. 1, 2 and 3 show a steering system employing a support mechanism 20a of a first exemplary embodiment as a first support mechanism of the invention. The steering system 10a includes a steering column 11 and a steering shaft 12 extending therethrough. The steering shaft 12 is supported within the steering column 11 so as to be rotatable in the circumferential direction.

In the steering system 10a, a rear part of the steering column 11 is supported to a part of the vehicle body (not shown) by an upper support bracket 13. A front part of the steering column 11 is supported to a part of the vehicle (not shown) by the support mechanism 20a. As schematically shown in FIG. 1, with the steering system 10a mounted in the vehicle, the front end of the steering shaft 12 is coupled to a steering link mechanism 16, and a steering wheel 17 is mounted to the rear end of the steering shaft 12. The steering wheel 17 incorporates an airbag 18 operated upon head-on collision of the vehicle to absorb the impact energy against the driver H.

Note that the upper support bracket 13 is mounted to a part of the vehicle, and supports the steering column 11 so that the steering column 11 can break away therefrom in the forward direction. The upper support bracket 13 allows the steering column 11 to break away therefrom in the forward direction of the vehicle when a prescribed load is applied to the steering column 11 in the forward direction. The upper support bracket 13 has a tilt lock mechanism. FIGS. 2 and 3 show an operation lever 14 for operating the lock mechanism for locking and unlocking.

Figure 4:
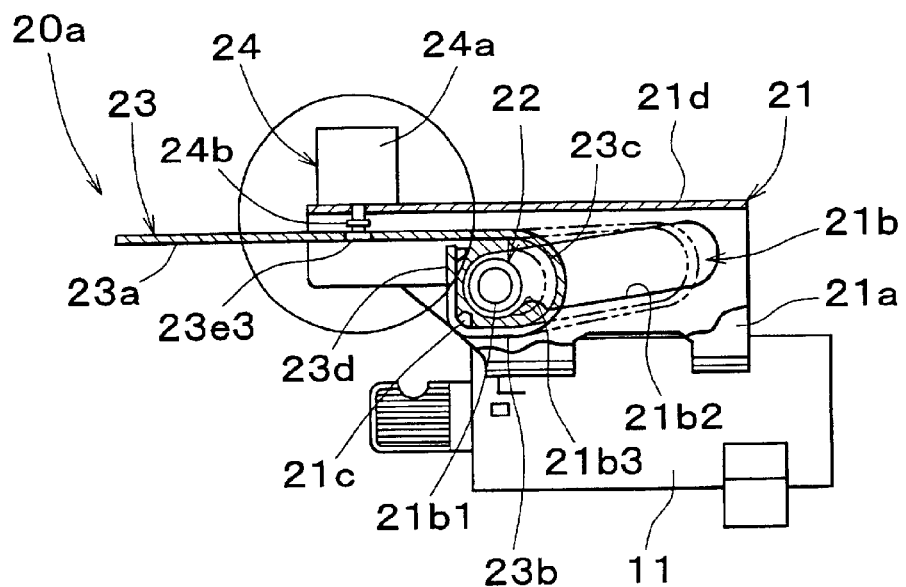
FIG. 4 is a sectional side elevation of a main part of the support mechanism of the first exemplary embodiment.

As shown in FIGS. 2 to 4, the support mechanism 20a includes a support bracket 21 as a support member, a support pin 22, a bent plate 23 as an energy absorbing member, and an engaging device 24 as a deformation characteristics changing device.

The support bracket 21 has a circular shape and is long sideways when viewed longitudinally. The support bracket 21 has sidewalls 21a facing each other, and a long hole 21b formed in each of the sidewalls 21a so that the respective long holes 21b face each other. Each long hole 21b extends backward from a position somewhat ahead of the center of the sidewall 21a in the obliquely upward direction. Each long hole 21b includes a circular hole portion 21b1 as a base end, an elongated hole portion 21b2 extending backward from the circular hole portion 21b1 in the obliquely upward direction, and a narrowed portion 21b3 connecting the hole portions 21b1, 21b2 together. The elongated hole portion 21b2 has approximately the same width as the diameter of the circular hole portion 21b1. The support bracket 21 is fixed to the upper portion of the outer periphery of the steering column 11 at the respective lower ends of both sidewalls 21a.

The support pin 22 is mounted to a lower support bracket 15 so as to extend through the long holes 21b of the support bracket 21. The lower support bracket 15 is fixed to a part of the vehicle body. In this state, the support pin 22 supports the front end of the steering column 11 to a part of the vehicle body through the support bracket 21 so that the steering column 11 is pivotable in the vertical direction. The support pin 22 initially extends through the circular hole portions 21b1 of the long holes 21b of the support bracket 21. By moving relative to the support bracket 21, the support pin 22 moves backward within the elongated hole portions 21b2 beyond the narrowed portions 21b3.

The bent plate 23 has a prescribed width and is bent by approximately 270 degrees at its rear end. The bent plate 23 includes an upper wall portion 23a, a lower wall portion 23b, an arc-shaped wall portion 23c and a vertical wall portion 23d. The upper wall portion 23a and the lower wall portion 23b face each other at a prescribed distance. The arc-shaped wall portion 23c connects the wall portions 23a, 23b together at their rear ends. The vertical wall portion 23d extends perpendicularly from the end of the lower wall portion 23b.

The bent plate 23 is positioned by a plurality of pins 21c arranged to surround the outer periphery of the circular hole portions 21b1 of the long holes 21b in the sidewalls 21a of the support bracket 21. In this state, the bent plate 23 is fixedly welded to the support bracket 21. The bent plate 23 surrounds the support pin 22 within the support bracket 21. The vertical wall portion 23d is located ahead of the support pin 22, and the arc-shaped wall portion 23c is located behind the support pin 22 and extends across the elongated hole portions 21b2 of the long holes 21b.

Figure 5A:
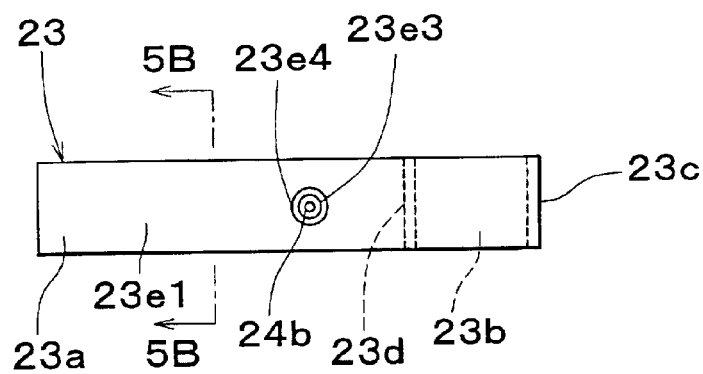
FIG. 5A is a plan view of a bent plate of the support mechanism of the first exemplary embodiment.
Figure 5B:
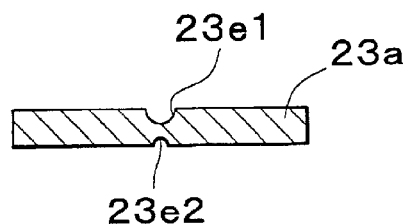
FIG. 5B is a sectional front elevation taken along line 5B—5B in FIG. 5A.

As shown in FIGS. 5A and 5B, the bent plate 23 has upper and lower grooves 23e1, 23e2 extending longitudinally along the central portion of the upper wall portion 23a in the width direction. The bent plate 23 further has a circular engaging hole 23e3 at the rear end of the grooves 23e1, 23e2, and a notch 23e4 connecting the engaging hole 23e3 to the grooves 23e1, 23e2.

The engaging device 24 includes a solenoid 24a and a shearing pin 24b. The shearing pin 24b advances and retreats according to whether current is applied to the solenoid 24a or not (i.e., according to switching (ON/OFF) control of the solenoid 24a). The engaging device 24 is attached to the support bracket 21 with the solenoid 24a fixed to the front end of an upper wall 21d of the support bracket 21. In this state, the shearing pin 24b of the engaging device 24 extends through the upper wall 21d of the support bracket 21 and faces the engaging hole 23e3 of the upper wall portion 23a of the bent plate 23 such that it can advance and retreat.

Figure 6A:
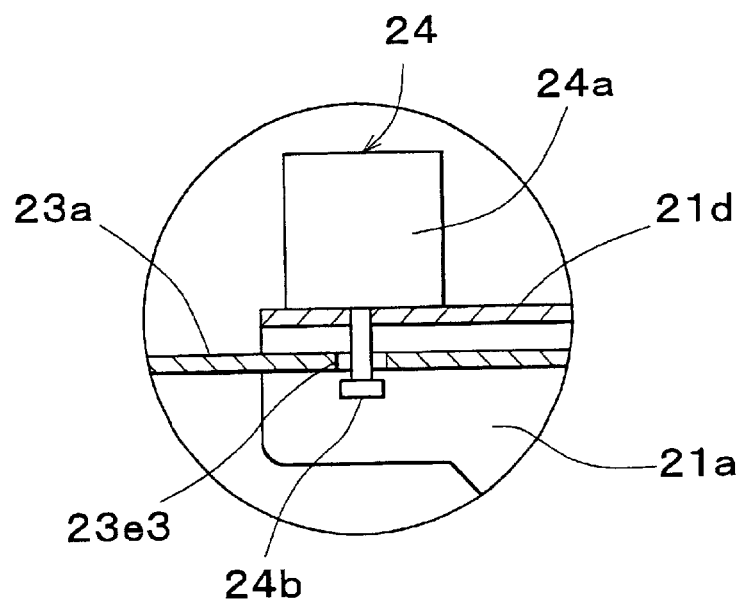
FIG. 6A is a side view showing an initial state of an engaging device of the support mechanism of the first exemplary embodiment.
Figure 6B:
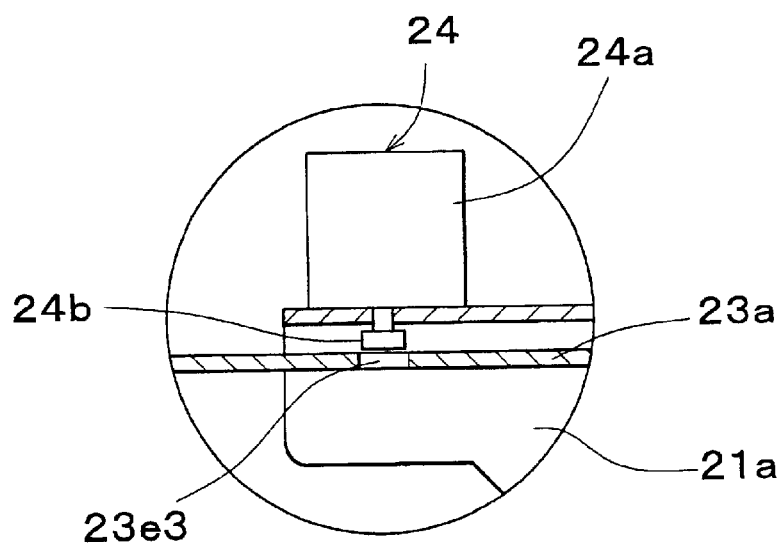
FIG. 6B is a side view showing an operating state of the engaging device of the support mechanism of the first exemplary embodiment.

When the solenoid 24a of the engaging device 24 carries current, the shearing pin 24b advances into the engaging hole 23e3 of the bent plate 23, as shown in FIG. 6A. When the solenoid 24a no longer carries current, the shearing pin 24b retreats upward away from the engaging hole 23e3 of the bent plate 23, as shown in FIG. 6B. Current is applied to the solenoid 24a upon starting of the engine. When the driver H does not fasten the seatbelt (whether the driver H fastens the seatbelt is detected by a sensor 92 mounted in the driver's seatbelt 91 in FIG. 1), an electrical control unit ECU in FIG. 1 continues to apply current to the solenoid 24a. Once the driver H fastens the seatbelt 91, the electrical control unit ECU discontinues current application to the solenoid 24a. Note that application and non-application of current to the solenoid 24a may be implemented in the manner opposite to that described above (it should be noted that, in either case, the shearing pin 24b advances when the driver H does not fasten the seatbelt, and retreats upward when the driver H fastens the seatbelt).

When the driver H moves forward and interferes with the steering wheel 17 upon a head-on collision of the vehicle, the steering system 10*a* supported to the vehicle body by such a support mechanism 20*a* moves the steering shaft 12 and the steering column 11 forward together with the support bracket 21.

The support pin 22 constituting the support mechanism 20*a* supporting the steering column 11 thus moves backward relative to the long holes 21*b* within the long holes 21*b* of the support bracket 21 with a force corresponding to the impact force. While moving relatively, the support pin 22 stretches the bent plate 23 to absorb the impact energy. The support mechanism 20*a* thus absorbs the impact energy of the steering wheel 17 against the driver H, thereby reducing the impact force of the steering wheel 17 against the driver H.

When the driver H does not fasten the seatbelt (i.e., when the predicted impact force applied from the steering column to the driver H is large), the solenoid 24*a* of the engaging device 24 carries current. The shearing pin 24*b* is therefore engaged with the engaging hole 23*e*3 of the bent plate 23, as shown in FIG. 6A. Accordingly, the bent plate 23 is stretched backward from the shearing pin 24*b*. The shearing pin 24*b* is forced into the grooves 23*e*1, 23*e*2 through the notch 23*e*4 of the bent plate 23, thereby shearing the bent plate 23.

When the driver H does not fasten the seatbelt, the support pin 22 moves backward while stretching the bent plate 23, in response to the impact. At the same time, the bent plate 23 is subjected to the shearing force along the grooves 23*e*1, 23*e*2. The support mechanism 20*a* thus absorbs a large amount of impact energy.

On the other hand, when the driver H fastens the seatbelt (when the predicted impact force applied from the steering column to the driver H is small), the solenoid 24*a* of the engaging device 24 carries no current. The shearing pin 24*b* is therefore disengaged from the engaging hole 23*e*3 of the bent plate 23, as shown in FIG. 6B. Accordingly, the bent plate 23 is stretched backward without being subjected to the shearing force of the shearing pin 24*b*. The support mechanism 20*a* thus absorbs a smaller amount of impact energy as compared to the case where the driver H does not fasten the seatbelt.

The support mechanism 20*a* is capable of changing the absorption amount of impact energy according to whether the driver H fastens the seatbelt or not (i.e., according to the predicted impact force applied from the steering column to the driver H). The support mechanism 20*a* makes good use of the structure of a support mechanism that is essential for supporting the steering system 10*a* to a part of the vehicle body. Accordingly, the support mechanism 20*a* can be inexpensively manufactured with a relatively simple structure without complicating the structure of the steering system 10*a*. As a result, increase in costs can be significantly suppressed. Note that, in addition to whether the driver H fastens the seatbelt or not, the predicted impact force may be calculated based on the signals from various sensors for detecting the vehicle speed, physical constitution of the driver H and the like (e.g., a seated position sensor 93 of FIG. 1 mounted in the driver's seat for detecting the seated position of the driver H, or a weight sensor) (the predicted impact force is always calculated during running of the vehicle).

Figure 7:
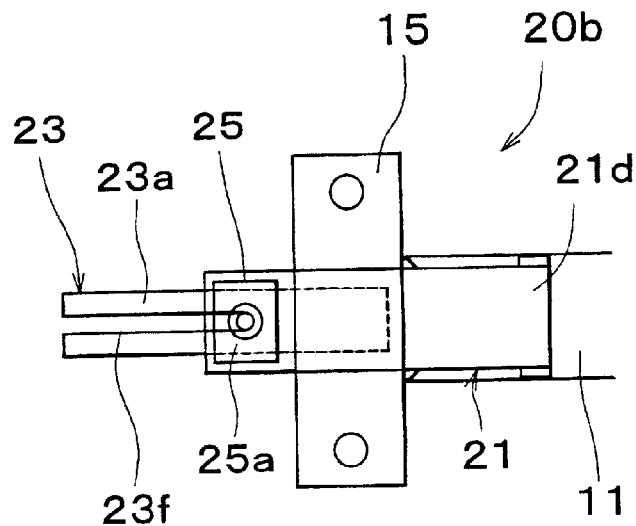
FIG. 7 is a plan view of a support mechanism of a second exemplary embodiment of the invention.
Figure 8:
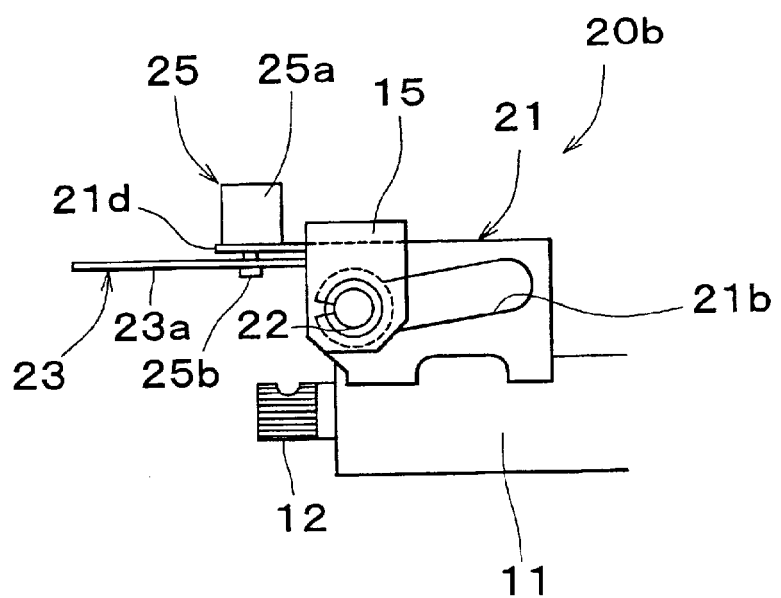
FIG. 8 is a side view of the support mechanism of the second exemplary embodiment.

FIGS. 7 and 8 show a support mechanism 20*b* of a second exemplary embodiment as a first support mechanism of the invention. The support mechanism 20*b* of the second exemplary embodiment basically has the same structure as that of the support mechanism 20*a* of the first exemplary embodiment except that the engaging device 24 of the support mechanism 20*a* is replaced with an engaging device 25. Accordingly, in the support mechanism 20*b* of the second exemplary embodiment, the same components and portions as those of the support mechanism 20*a* of the first exemplary embodiment are denoted with the same reference numerals and characters, and detailed description thereof will be omitted.

Figure 9A:
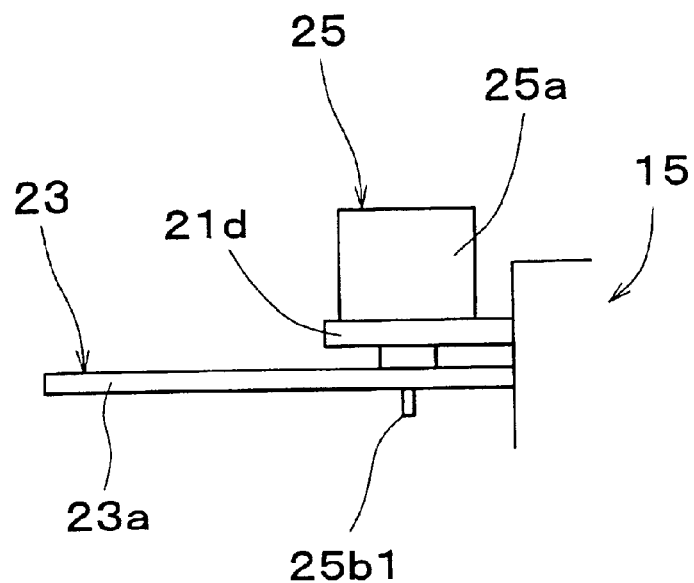
FIG. 9A is a side view showing an initial state of an engaging device of a first modification that can be used in the support mechanism of the second exemplary embodiment.
Figure 9B:
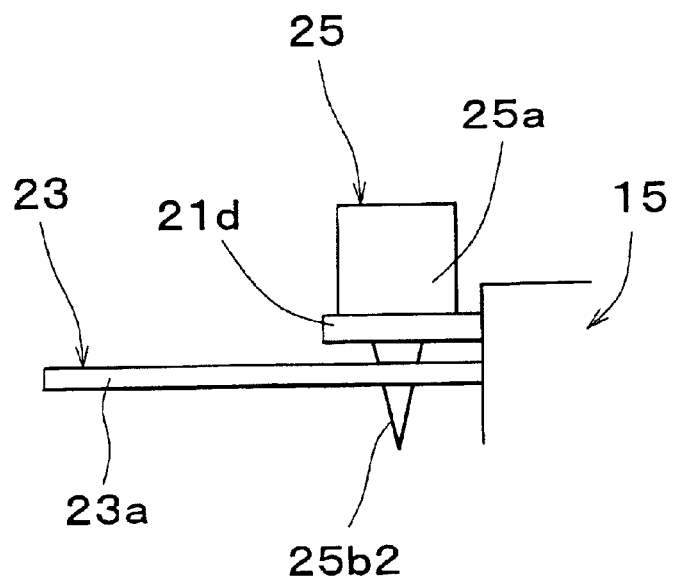
FIG. 9B is a side view showing an initial state of an engaging device of a second modification that can be used in the support mechanism of the second exemplary embodiment.

The engaging device 25 of the support mechanism 20*b* includes a solenoid 25*a* and a deforming pin 25*b* that advances or retreats according to switching (ON/OFF) control of the solenoid 25*a*. The engaging device 25 is attached to the support bracket 21 with the solenoid 25*a* fixed to the front end of the upper wall 21*d* of the support bracket 21. In this state, the deforming pin 25*b* of the engaging device 25 extends through the upper wall 21*d* of the support bracket 21 and faces the base end of a slit hole 23*f* of the bent plate 23 such that it can advance and retreat. Like deforming pins 25*b*1, 25*b*2 of FIGS. 9A and 9B, the deforming pin 25*b* may have a stepped shape or a tapered shape whose diameter is gradually reduced toward the tip thereof.

When the solenoid 25*a* of the engaging device 25 carries current, the deforming pin 25*b* advances into the slit hole 23*f* of the bent plate 23. When the solenoid 25*a* no longer carries current, the deforming pin 25*b* retreats upward away from the slit hole 23*f* of the bent plate 23. Current is applied to the solenoid 25*a* upon starting of the engine. When the driver H does not fasten the seatbelt, current continues to be applied to the solenoid 25*a*. Once the driver H fastens the seatbelt, current application to the solenoid 25*a* is discontinued. Note that application and non-application of current to the solenoid 25*a* may be implemented in the manner opposite to that described above.

When the driver H moves forward and interferes with the steering wheel 17 upon head-on collision of the vehicle, the steering system 10*a* supported by such a support mechanism 20*b* moves the steering shaft 12 and the steering column 11 forward together with the support bracket 21.

The support pin 22 constituting the support mechanism 20*b* supporting the steering column 11 thus moves backward relative to the long holes 21*b* within the long holes 21*b* of the support bracket 21 with a force corresponding to the impact force. While moving backward, the support pin 22 stretches the bent plate 23 to absorb the impact energy. The support mechanism 20*b* thus absorbs the impact energy of the steering wheel 17 against the driver H, thereby reducing the impact force of the steering wheel 17 against the driver H.

When the driver H does not fasten the seatbelt, the solenoid 25*a* of the engaging device 25 carries current. The deforming pin 25*b* therefore advances into the slit hole 23*f* of the bent plate 23, as shown in FIG. 8. Accordingly, the bent plate 23 is stretched backward from the deforming pin 25*b*. The deforming pin 25*b* deforms both side edges of the slit hole 23*f* while moving relative to the bent plate 23.

When the driver H does not fasten the seatbelt, the support pin 22 moves backward while stretching the bent plate 23, in response to the impact. At the same time, the bent plate 23 is subjected to the deforming force that deforms both side edges of the slit hole 23*f*. The support mechanism 20*b* thus absorbs a large amount of impact energy.

On the other hand, when the driver H fastens the seatbelt, the solenoid 25*a* of the engaging device 25 carries no current. The deforming pin 25*b* therefore retreats upward away from the slit hole 23f of the bent plate 23. Accordingly, the bent plate 23 will not be subjected to the deforming force from the deforming pin 25b. The support mechanism 20b thus absorbs a smaller amount of impact energy as compared to the case where the driver H does not fasten the seatbelt.

In the support device 25, the amount of current to be applied to the solenoid 25a when the driver H does not fasten the seatbelt can be controlled according to the magnitude of the predicted impact force applied from the steering column to the driver H upon collision of the vehicle. The predicted impact force is obtained based on whether the driver H fastens the seatbelt, vehicle speed, physical constitution of the driver H and the like. When the predicted impact force is large, the protruding length of the deforming pin 25b is increased. As a result, the deforming pin 25b1 of FIG. 9A can be engaged with the slit hole 23f at a stepped portion with a larger diameter, and the deforming pin 25b2 of FIG. 9B can be engaged with the slit hole 23f at a thicker tapered portion. Accordingly, the support mechanism 20b can absorb an increased amount of impact energy.

Figure 10:
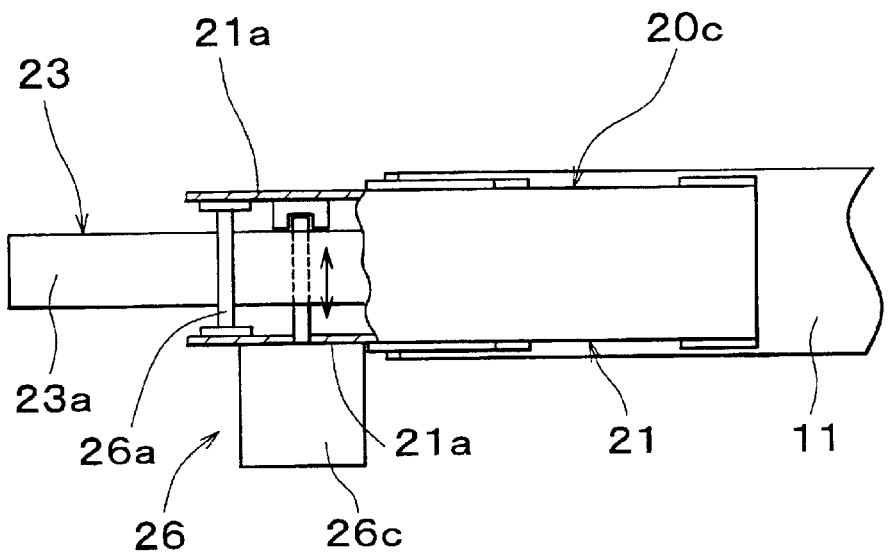
FIG. 10 is a partially cutaway plan view of a support mechanism of a third exemplary embodiment of the invention.
Figure 11:
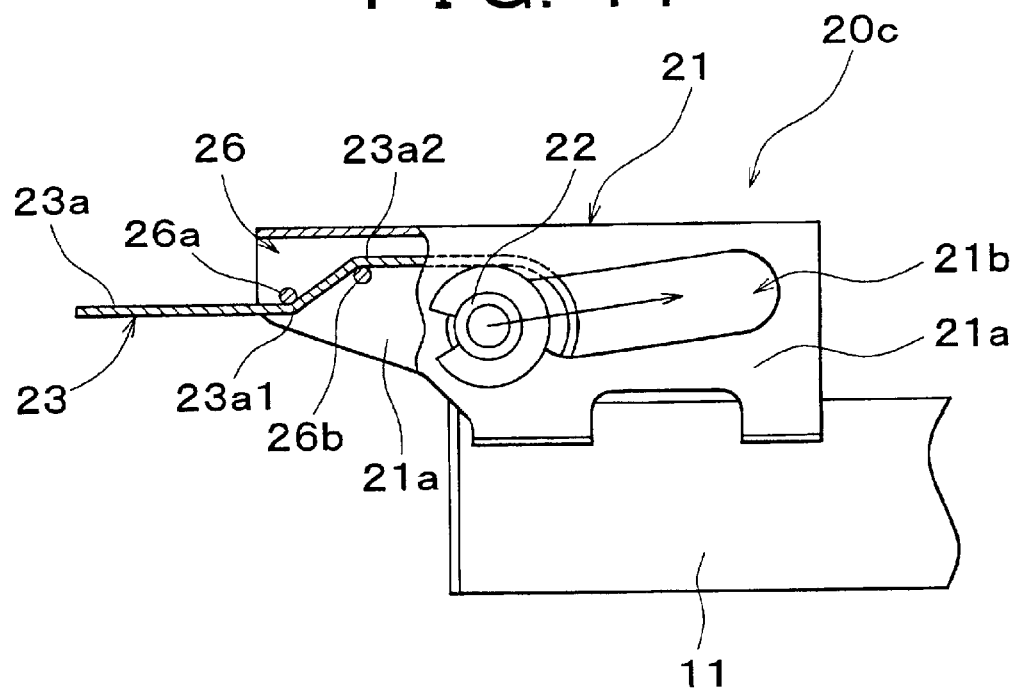
FIG. 11 is a partially cutaway side view of the support mechanism of the third exemplary embodiment.

FIGS. 10 and 11 show a support mechanism 20c of a third exemplary embodiment as a first support mechanism of the invention. The support mechanism 20c basically has the same structure as that of the support mechanism 20a of the first exemplary embodiment except that the engaging device 24 of the support mechanism 20a is replaced with a squeezing device 26. In the support mechanism 20c of the third exemplary embodiment, the same components and portions as those of the support mechanism 20a of the first exemplary embodiment are denoted with the same reference numerals and characters, and detailed description thereof will be omitted.

The squeezing device 26 in the support mechanism 20c of the third exemplary embodiment includes a fixed pin 26a, a movable pin 26b and a solenoid 26c connected to the movable pin 26b. The fixed pin 26a is attached to the respective front ends of the sidewalls 21a of the support member 21 so as to extend therebetween. The solenoid 26c is attached to the outer surface of one sidewall 21a of the support member 21. The solenoid 26c holds the movable pin 26b so that the movable pin 26b is retractable from one sidewall 21a toward the inner surface of the other sidewall 21a. The fixed pin 26a is disposed at a front lower bent portion 23a1 of the upper wall portion 23a of the bent plate 23. The movable pin 26b is disposed at a rear upper bent portion 23a2 of the upper wall portion 23a of the bent plate 23 such that it can advance and retreat.

When the solenoid 26c carries current, the movable pin 26b advances to the rear upper bent portion 23a2 of the upper wall portion 23a of the bent plate 23. When the solenoid 26c no longer carries current, the movable pin 26b retreats away from the upper bent portion 23a2. Current is applied to the solenoid 26c upon starting of the engine. When the driver H does not fasten the seatbelt, current continues to be applied to the solenoid 26c. Once the driver H fastens the seatbelt, current application to the solenoid 26c is discontinued. Note that application and non-application of current to the solenoid 26c may be implemented in the manner opposite to that described above.

When the driver H moves forward and interferes with the steering wheel 17 upon head-on collision of the vehicle, the steering system 10a supported by such a support mechanism 20c moves the steering shaft 12 and the steering column 11 forward together with the support bracket 21.

The support pin 22 constituting the support mechanism 20c supporting the steering column 11 thus moves backward relative to the long holes 21b within the long holes 21b of the support bracket 21 with a force corresponding to the impact force. While moving backward, the support pin 22 stretches the bent plate 23 to absorb the impact energy. The support mechanism 20c thus absorbs the impact energy of the steering wheel 17 against the driver H, thereby reducing the impact force of the steering wheel 17 against the driver H.

When the driver H does not fasten the seatbelt, the solenoid 26c constituting the squeezing device 26 carries current. The movable pin 26b therefore advances to the upper bent portion 23a2 of the bent plate 23, as shown in FIGS. 10 and 11. Accordingly, the bent plate 23 is stretched backward from the movable pin 26b. At this time, the movable pin 26c and the fixed pin 26a squeeze the bent plate 23.

When the driver H does not fasten the seatbelt, the support pin 22 moves relatively backward while stretching the bent plate 23, in response to the impact. At the same time, the bent plate 23 is subjected to the squeezing force from the fixed pin 26a and the movable pin 26b. The support mechanism 20c thus absorbs a large amount of impact energy.

On the other hand, when the driver H fastens the seatbelt, the solenoid 26c constituting the squeezing device 26 carries no current. The movable pin 26b therefore retreats away from the upper bent portion 23a2 of the bent plate 23. Accordingly, the bent plate 23 is stretched backward from the fixed pin 26a. At this time, the bent plate 23 is not subjected to the squeezing force from the movable pin 26a, but subjected only to the squeezing force from the fixed pin 26a. The support mechanism 20c thus absorbs a smaller amount of impact energy as compared to the case where the driver H does not fasten the seatbelt.

Figure 12:
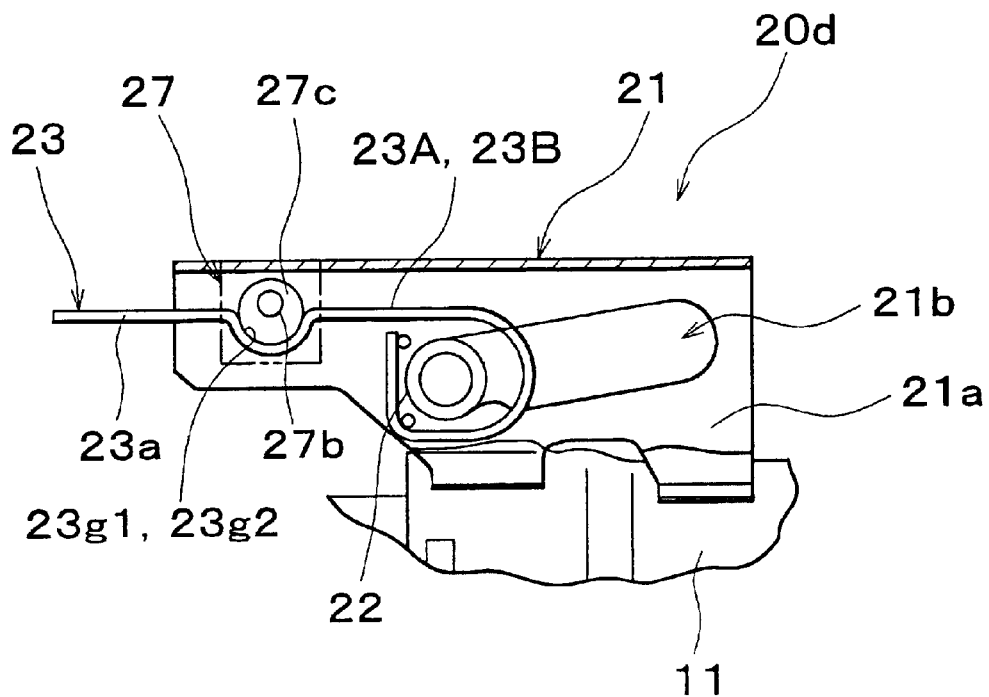
FIG. 12 is a sectional side elevation of a main part of a support mechanism of a fourth exemplary embodiment of the invention.
Figure 13:
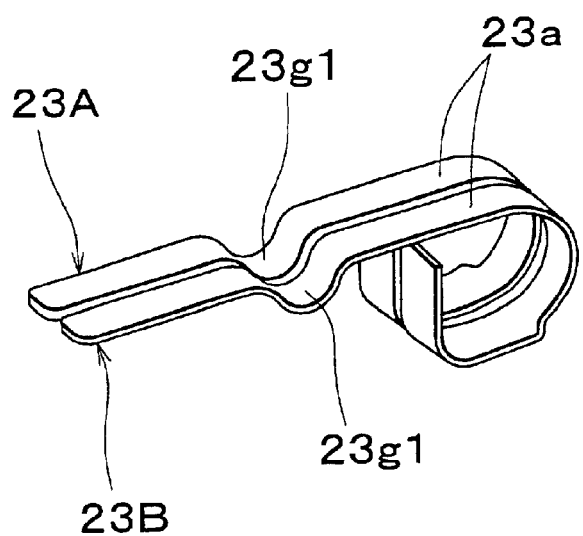
FIG. 13 is a perspective view of bent plates of the support mechanism of the fourth exemplary embodiment.

FIG. 12 shows a support mechanism 20d of a fourth exemplary embodiment as a first support mechanism of the invention. The support mechanism 20d of the fourth exemplary embodiment basically has the same structure as that of the support mechanism 20a of the first exemplary embodiment except that the support mechanism 20d employs two bent plates 23A, 23B having different thicknesses instead of the bent plate 23, and a deformation characteristics changing device 27. Accordingly, in the support mechanism 20d of the fourth exemplary embodiment, the same components and portions as those of the support mechanism 20a of the first exemplary embodiment are denoted with the same reference numerals and characters, and detailed description thereof will be omitted.

The bent plates 23A, 23B of the support mechanism 20d have different deformation characteristics. The bent plate 23A is thick and has high deformation characteristics, whereas the bent plate 23B is thin and has low deformation characteristics. The bent plates 23A, 23B are bent in the same manner as that of the bent plate 23, and arranged in parallel with each other in the support bracket 21. Each of the bent plates 23A, 23B has an arc-shaped bent portion 23g1, 23g2 at an intermediate position of the upper wall portion 23a. Note that the bent plates 23A, 23B may have different widths or may be formed from different materials so that they have different deformation characteristics.

As shown in FIGS. 12 and 14A to 14C, the deformation characteristics changing device 27 includes an electric motor 27a, a threaded shaft 27b integral with the output shaft of the motor 27a, and a nut member 27c retractably screwed on the threaded shaft 27b. The motor 27a is attached to the outer surface of one sidewall 21a of the support bracket 21. The threaded shaft 27b rotatably extends through the sidewall 21a and extends on the bent portions 23g1, 23g2 of the bent plates 23A, 23B. The nut member 27c is eccentrically screwed on the threaded shaft 27b, and engaged with one or both of the bent portions 23g1, 23g2 of the bent plate 23. Note that the nut member 27c may have a non-circular cross section.

Figure 14A:
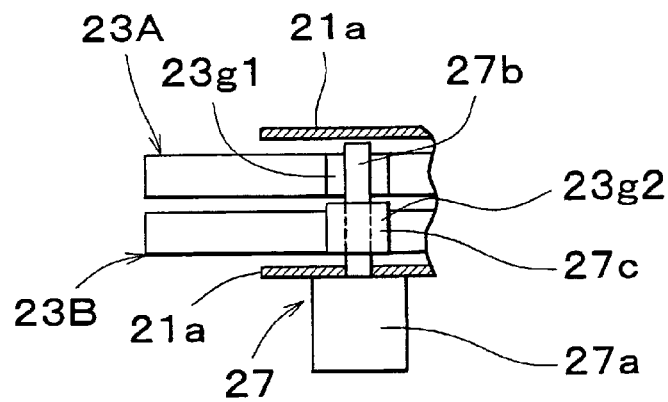
FIG. 14A is a plan view showing an operating state of a squeezing device constituting the support mechanism of the fourth exemplary embodiment.
Figure 14B:
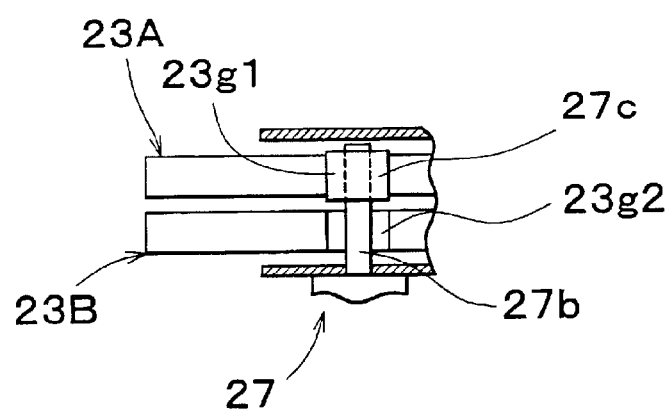
FIG. 14B is a plan view showing an operating state of the squeezing device constituting the support mechanism of the fourth exemplary embodiment.

The deformation characteristics changing device 27 drives the motor 27a according to whether the driver H fastens the seatbelt. Basically, the deformation characteristics changing device 27 thus selectively moves the nut member 27c to either the bent portion 23g1 or 23g2 of the bent plate 23 for engagement. When the driver H does not fasten the seatbelt, the deformation characteristics changing device 27 moves the nut member 27c to the bent portion 23g1 of the thick bent plate 23A having high deformation characteristics, as shown in FIG. 14B. When the driver H fastens the seatbelt, the deformation characteristics changing device 27 moves the nut member 27c to the bent portion 23g2 of the thin bent plate 23B having low deformation characteristics, as shown in FIG. 14A. (The bent plate 23A has high deformation characteristics. Therefore, large force is required to deform the bent plate 23A by a predetermined amount.)

Accordingly, when the driver H does not fasten the seatbelt, the support pin 22 relatively moves backward relative to the long holes 21b while stretching the bent plates 23A, 23B, in response to the impact. At the same time, the thick bent plate 23A having high deformation characteristics is subjected to the bending force from the nut member 27c. The support mechanism 20d thus absorbs a large amount of impact energy when the driver H does not fasten the seatbelt.

On the other hand, when the driver H fastens the seatbelt, the support pin 22 moves relatively backward while stretching the bent plates 23A, 23B, in response to the impact. At the same time, the thin bent plate 23B having low deformation characteristics is subjected to the deforming force from the nut member 27c. When the driver H fastens the seatbelt, the support mechanism 20d thus absorbs a smaller amount of impact energy as compared to the case where the driver H does not fasten the seatbelt.

Figure 14C:
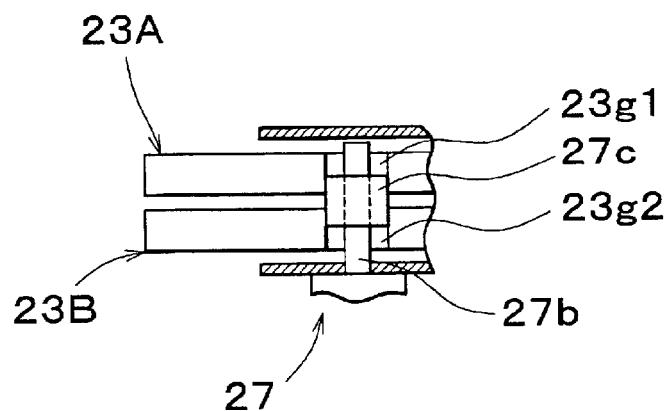
FIG. 14C is a plan view showing an operating state of the squeezing device constituting the support mechanism of the fourth embodiment.

Note that, in the support mechanism 20d, the motor 27a can drive the nut member 27c to be positioned across the bent portions 23g1 23g2 of the bent plates 23A, 23B, as shown in FIG. 14C. In this state, the nut member 27c bends both bent plates 23A, 23B simultaneously, allowing the support mechanism 20d to absorb a further increased amount of impact energy. In the case of a driver with a good constitution (see the driver Hr in FIG. 1), the motor 27a may drive the nut member 27c to the state of FIG. 14C and the state of FIG. 14A or 14B.

Figure 15A:
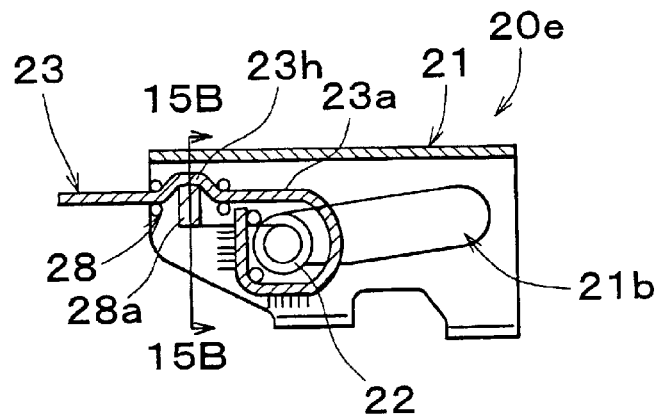
FIG. 15A is a sectional side elevation showing an operating state of a support mechanism of a fifth exemplary embodiment of the invention.
Figure 15B:
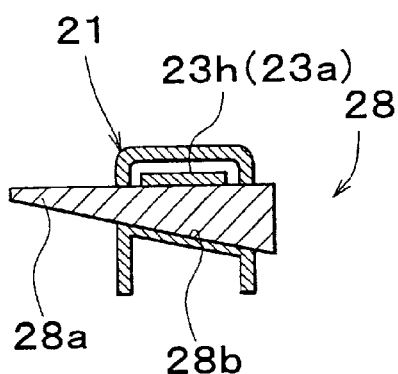
FIG. 15B is a sectional front elevation taken along line 15B—15B in FIG. 15A.
Figure 15C:
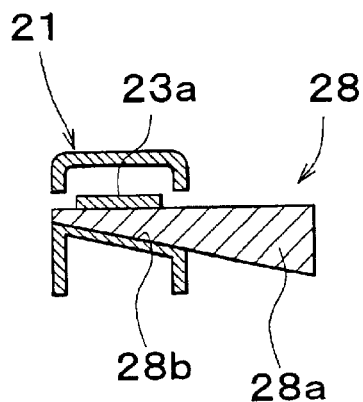
FIG. 15C is a sectional front elevation taken along line 15C—15C in FIG. 15A, showing the state where a slide pin is retracted.

FIGS. 15A to 15C show a support mechanism 20e of a fifth exemplary embodiment as a first support mechanism of the invention. The support mechanism 20e of the fifth exemplary embodiment basically has the same structure as that of the support mechanism 20a of the first exemplary embodiment except that the support mechanism 20e employs a slide pin device 28 as a deformation characteristics changing device instead of the engaging device of the support mechanism 20a of the first exemplary embodiment. Accordingly, in the support mechanism 20e of the fifth exemplary embodiment, the same components and portions as those of the support mechanism 20a of the first exemplary embodiment are denoted with the same reference numerals and characters, and a detailed description thereof will be omitted.

The slide pin device 28 constituting the support mechanism 20e includes a wedge slide pin (slide plate) 28a having a shape of approximately right triangle when viewed laterally, a tilted support member 28b for slidably holding the slide pin 28a, and a not-shown driving device that advances and retracts the slide pin 28a. Note that the driving device may be an electrical device that advances or retracts the slide pin 28a by a solenoid, or a mechanical device that pushes and pulls the slide pin 28a by a cable.

The slide pin 28a perpendicularly crosses the upper wall portion 23a of the bent plate 23 while abutting on the lower surface of the upper wall portion 23a. As shown in FIG. 15B, in the initial state where the driving device is not operated, the slide pin 28a perpendicularly advances relative to the upper wall portion 23a of the bent plate 23, and locally raises the upper wall portion 23a to form a protruding portion 23h. When the driver H fastens the seatbelt, the driving device is operated to retract the slide pin 28a by a prescribed amount relative to the upper wall portion 23a of the bent plate 23, as shown in FIG. 15C.

When the driver H moves forward and interferes with the steering wheel 17 upon head-on collision of the vehicle, the steering system 10a supported by such a support mechanism 20e moves the steering shaft 12 and the steering column 11 forward together with the support bracket 11.

The support pin 22 constituting the support mechanism 20e supporting the steering column 11 thus moves backward within the long holes 21b of the support bracket 21 with a force corresponding to the impact force. While moving backward, the support pin 22 stretches the bent plate 23 to absorb the impact energy. The support mechanism 20e thus absorbs the impact energy of the steering wheel 17 against the driver H, thereby reducing the impact force of the steering wheel 17 against the driver H.

Figure 17A:
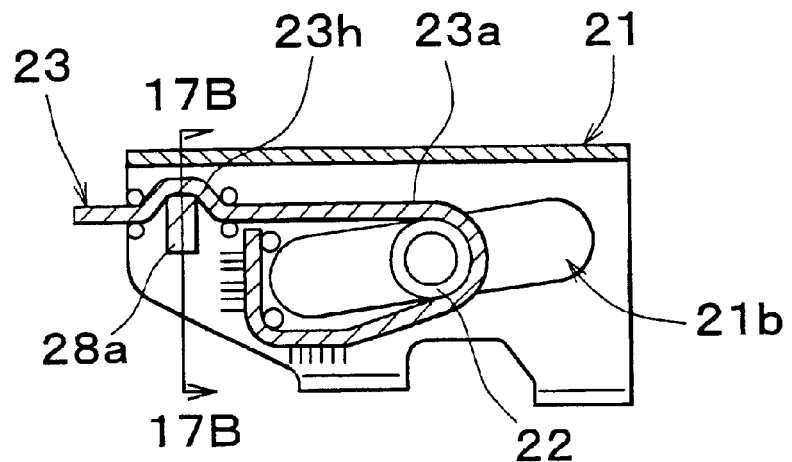
FIG. 17A is a sectional side elevation showing the state where the energy absorption amount in the support mechanism of the fifth exemplary embodiment is maximized.
Figure 17B:
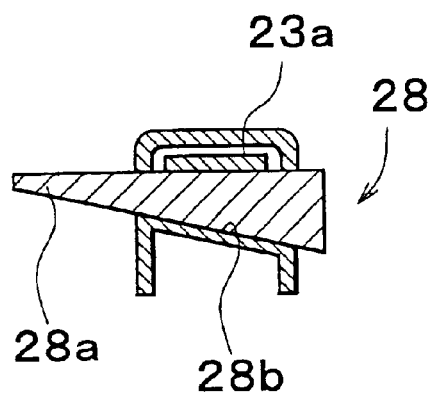
FIG. 17B is a sectional front elevation taken along line 17B—17B in FIG. 17A.
Figure 18:
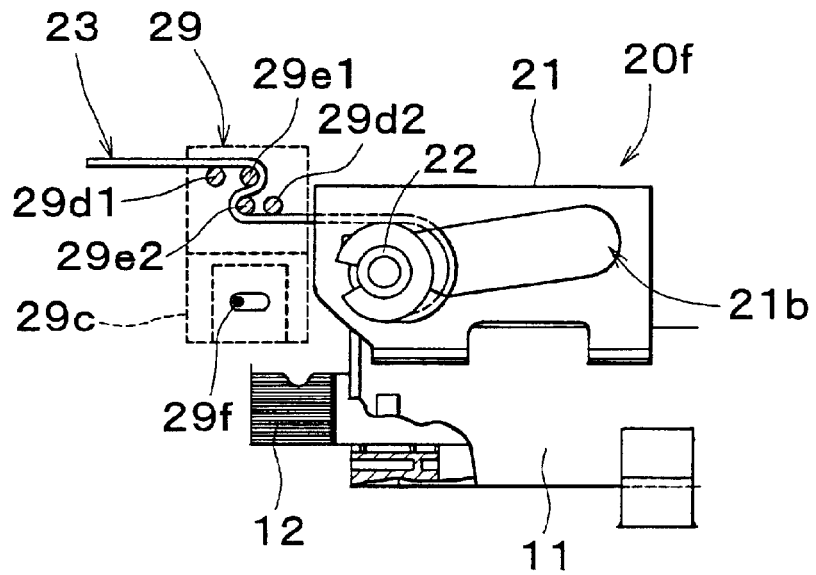
FIG. 18 is a sectional side elevation of a main part of a support mechanism of a sixth exemplary embodiment of the invention.
Figure 19:
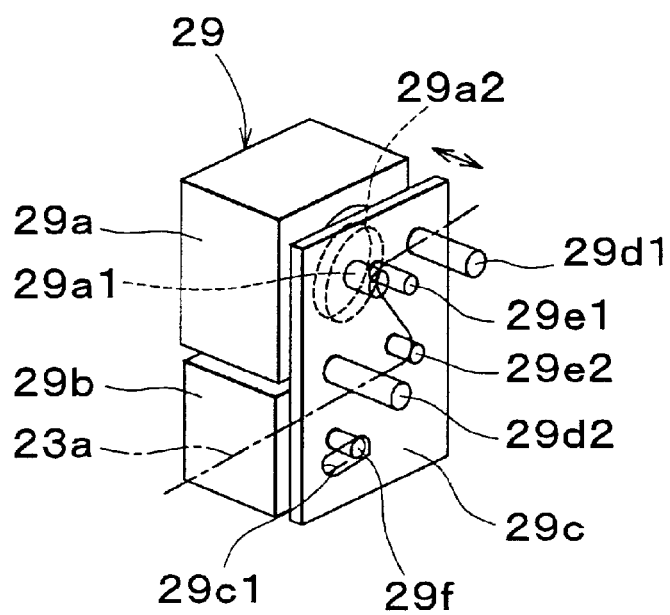
FIG. 19 is a perspective view of a pin interfering device constituting the support mechanism of the sixth exemplary embodiment.

When the driver H does not fasten the seatbelt, the support mechanism 20e is in the same state as the initial state shown in FIGS. 15A, 15B, and the bent plate 23 is stretched backward from the slide pin 28a. As shown in FIGS. 17A and 17B, the slide pin 28a deforms the relatively moving bent plate 23 into the same shape as that of the protruding portion 23h. As a result, when the driver H does not fasten the seatbelt, the support pin 22 relatively moves backward while stretching the bent plate 23, in response to the impact. At the same time, the bent plate 23 is subjected to the deforming force from the slide pin 28a. The support mechanism 20e thus absorbs a large amount of impact energy.

Figure 16A:
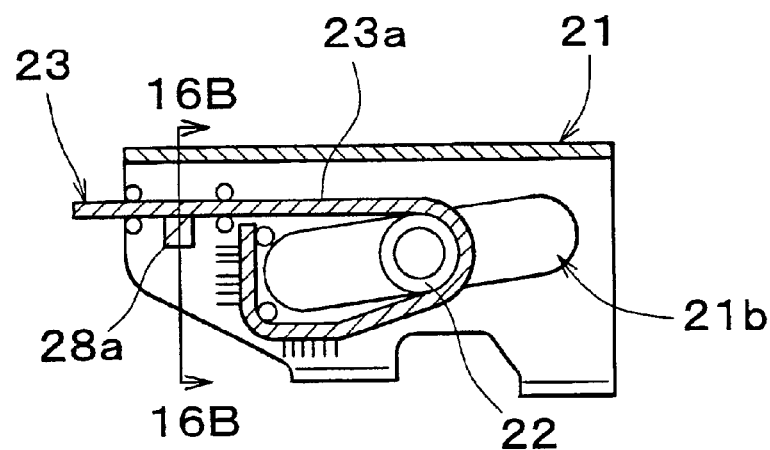
FIG. 16A is a sectional side elevation showing the state where the energy absorption amount in the support mechanism of the fifth exemplary embodiment is minimized.
Figure 16B:
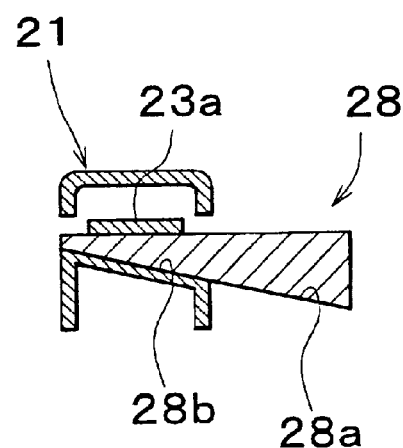
FIG. 16B is a sectional front elevation taken along line 16B—16B in FIG. 16A.

On the other hand, when the driver H fastens the seatbelt, the driving device retracts the slide pin 28a by a prescribed amount relative to the upper wall portion 23a of the bent plate 23. Accordingly, as shown in FIGS. 16A and 16B, the bent plate 23 is stretched backward without being subjected to any deforming force from the slide pin 28a. The support mechanism 20e thus absorbs a smaller amount of impact energy as compared to the case where the driver H does not fasten the seatbelt.

FIGS. 18 to 22 show a support mechanism 20f of a sixth exemplary embodiment as a first support mechanism of the invention. The support mechanism 20f of the sixth exemplary embodiment basically has the same structure as that of the support mechanism 20a of the first exemplary embodiment except that the support mechanism 20f employs a pin interfering device 29 as a deformation characteristics changing device instead of the engaging device 24 of the support mechanism 20a of the first exemplary embodiment. Accordingly, in the support mechanism 20f of the sixth exemplary embodiment, the same components and portions as those of the support mechanism 20a of the first exemplary embodiment are denoted with the same reference numerals and characters, and a detailed description thereof will be omitted.

The pin interfering device 29 in the support mechanism 20f of the sixth embodiment includes first and second solenoids 29a, 29b, a support plate 29c, a spring 29a2, a pair of long guide pins 29d1, 29d2, a pair of short interfering pins 29e1, 29e2, and a support pin 29f. The support plate 29c is pivotally supported to the tip of a plunger 29a1 of the first solenoid 29a. The spring 29a2 biases the support plate 29c in the direction in which the plunger 29a1 protrudes. The pair of long guide pins 29d1, 29d2 and the pair of short interfering pins 29e1, 29e2 are mounted to the support plate 29c. The support pin 29f is connected to the second solenoid 29b, so as to advance and retreat within a long hole 29c1 of the support plate 29.

One guide pin 29d1 is disposed at an upper front position of the support plate 29c, and the other guide pin 29d2 is disposed at a central rear position of the support plate 29c. The interfering pins 29e1, 29e2 are disposed at a distance in the vertical direction between the guide pins 29d1, 29d2 in the support plate 29c. The support plate 29c is in an advanced position (see FIG. 20A) when the first solenoid 29a carries no current. The support plate 29c moves to a retracted position (see FIG. 21A) when current is applied to the first solenoid 29a. The support pin 29f advances into the long hole 29c 1 of the support plate 29c when the second solenoid 29b carries no current. The support pin 29f retreats away from the long hole 29c1 of the support plate 29c when current is applied to the second solenoid 29b.

Figure 20A:
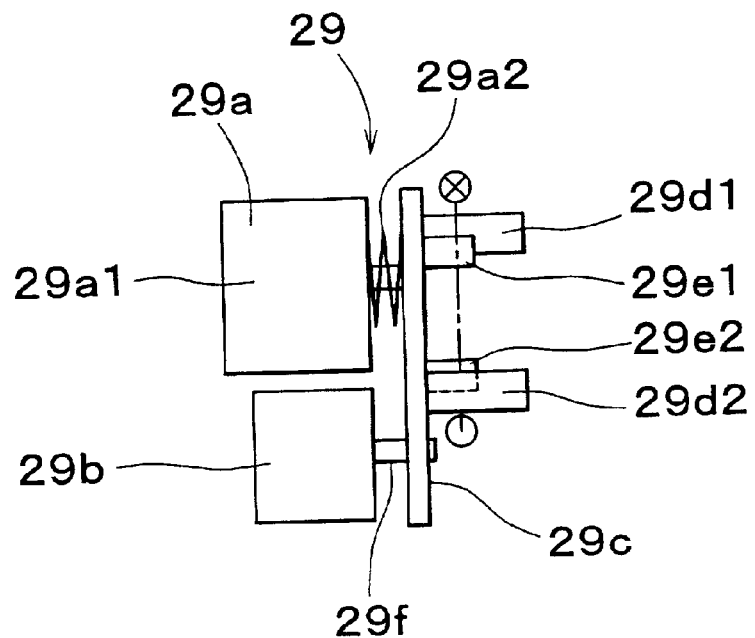
FIG. 20A is a side view showing the state where the energy absorption amount in the pin interfering device is maximized.
Figure 20B:
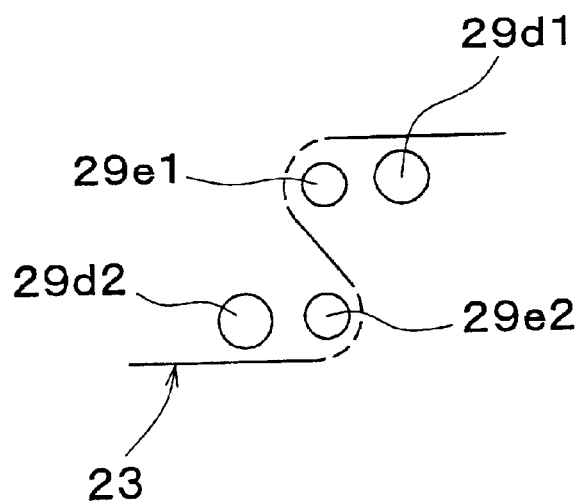
FIG. 20B shows pin arrangement of the pin interfering device in the state where the energy absorption amount is maximized.
Figure 21A:
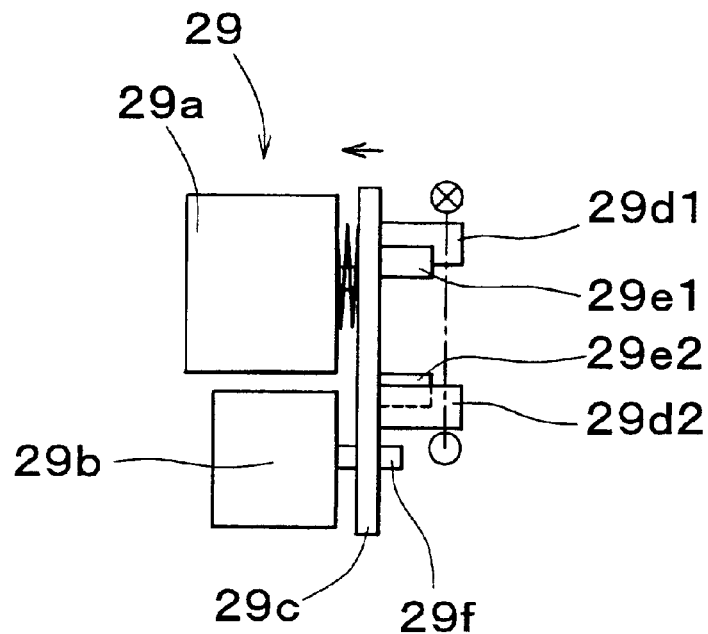
FIG. 21A is a side view showing the state where the energy absorption amount in the pin interfering device is minimized.
Figure 21B:
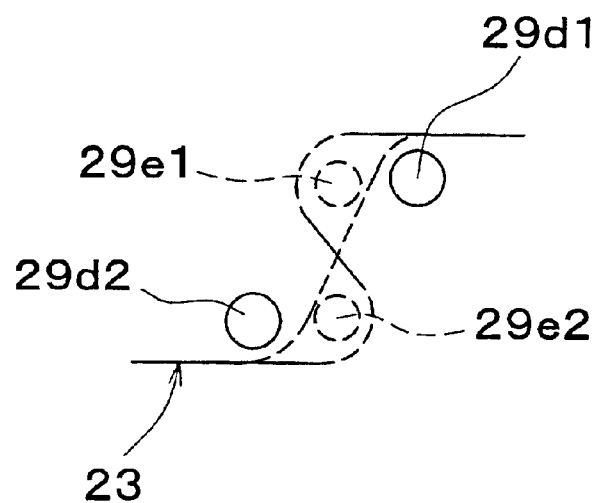
FIG. 21B shows pin arrangement of the pin interfering device in the state where the energy absorption amount is minimized.
Figure 22:
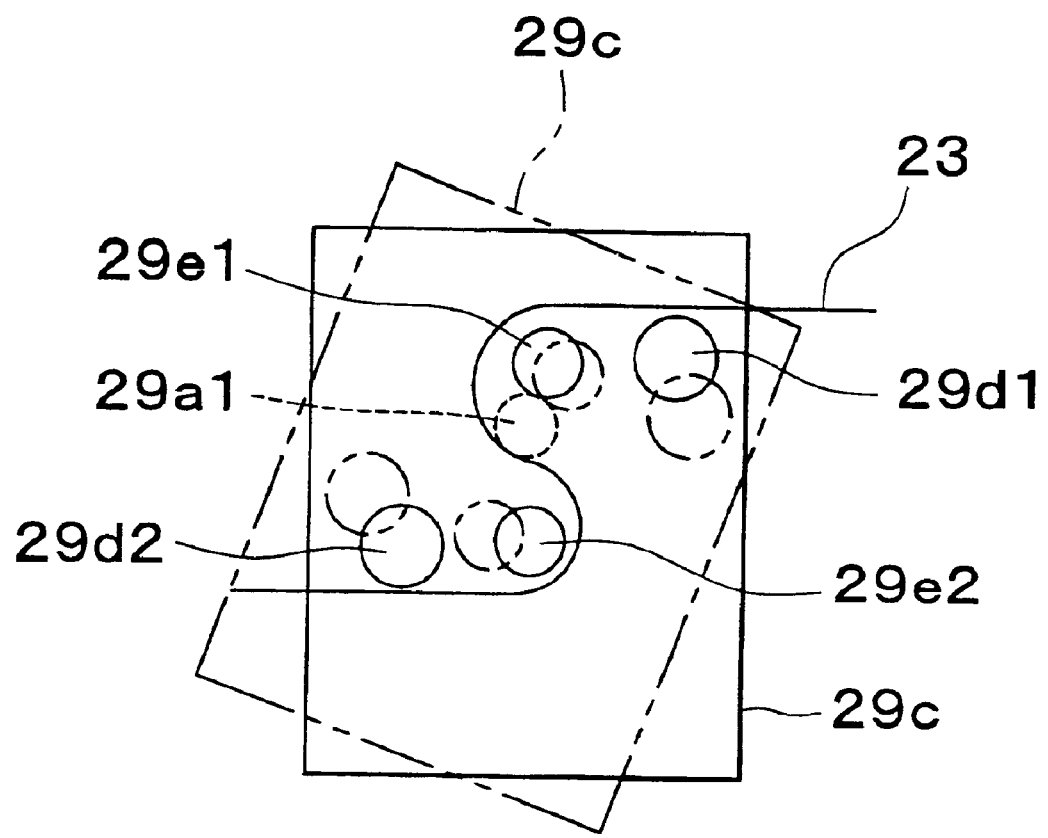
FIG. 22 is a front view showing a pivoting state of a support plate of the pin interfering device.

The bent plate 23 is moved with its upper wall portion 23a guided by the guide pins 29d1, 29b2. When the support plate 29c is in the advanced position, the interfering pins 29e1, 29e2 face the course of the movement of the bent plate 23, as shown in FIGS. 20A and 20B. The interfering pins 29e1, 29e2 thus guide the moving bent plate 23 while interfering with it. When the support plate 29c is in the retracted position, the interfering pins 29e1, 29e2 are located away from the course of the movement of the bent plate 23, as shown in FIGS. 21A and 21B. Therefore, the interfering pins 29e1, 29e2 will not interfere with the moving bent plate 23.

When the driver H moves forward and interferes with the steering wheel 17 upon head-on collision of the vehicle, the steering system 10a supported by such a support mechanism 20f moves the steering shaft 12 and the steering column 11 forward together with the support bracket 21.

The support pin 22 constituting the support mechanism 20f supporting the steering column 11 thus moves backward relative to the long holes 21b within the long holes 21b of the support bracket 21 with a force corresponding to the impact force. While moving backward, the support pin 22 stretches the bent plate 23 to absorb the impact energy. The support mechanism 20f thus absorbs the impact energy of the steering column 17 against the driver H, thereby reducing the impact force of the steering wheel 17 against the driver H.

The support mechanism 20f absorbs an increased amount of impact energy because of the bending effect of the pin interfering device 29. The bending effect of the pin interfering device 29 may be changed as appropriate by the switching (ON/OFF) control of the solenoids 29a, 29b.

More specifically, when the first solenoid 29a carries no current, the support plate 29c is in the advanced position and allows the guide pins 29d1, 29d2 and the interfering pins 29e1, 29e2 to face the course of the movement of the bent plate 23, as shown in FIGS. 20A and 20B. Accordingly, the bent plate 23 is bent by the interfering pins 29e1, 29e2 to a large degree while moving relatively. On the other hand, when the first solenoid 29a carries current, the support plate 29c is in the retracted position, and the interfering pins 29e1, 29e2 retreat away from the course of the movement of the bent plate 23, as shown in FIGS. 21A and 21B. Accordingly, the interfering pins 29e1, 29e2 do not interfere with the bent plate 23. The bent plate 23 is thus slightly bent by the guide pins 29d1, 29d2, as shown by dashed line in FIG. 21B.

These bending effects are changed by the switching (ON/OFF) control of the second solenoid 29b. More specifically, when the second solenoid 29b carries no current, the support pin 29f advances into the long hole 29c1 of the support plate 29c. This restricts pivoting of the support plate 29c, so that the support plate 29c is in the fixed state. As a result, the guide pins 29d1, 29d2 and the interfering pins 29e1, 29e2 are located at the positions shown in FIG. 20B or 21B, providing the different bending effects described above.

On the other hand, when the second solenoid 29b carries current, the support pin 29f retreats away from the long hole 29c1 of the support plate 29c. Therefore, the support plate 29c is pivotable about the plunger 29a1 of the first solenoid 29a. While the bent plate 23 is being stretched, the support plate 29c pivots as shown by phantom line in FIG. 22 so as to increase the tilt angle of the line connecting the respective centers of the guide pins 29d1, 29d2 and the line connecting the respective centers of the interfering pins 29e1, 29e2 relative to the vertical line.

In this case, the bent plate 23 is bent to a smaller degree between the guide pins 29d1, 29d2 and between the interfering pins 29e1, 29e2 as compared to the case where pivoting of the support plate 29c is restricted. The support mechanism 20f thus absorbs a reduced amount of impact energy. Table 1 below shows the amount of impact energy absorbed by the support mechanism 20f as a result of the switching (ON/OFF) control of the solenoids 29a, 29b. In Table 1, "SOL1" and "SOL2" indicates the first solenoid 29a and the second solenoid 29b, respectively, and "EA Load" indirectly indicates the amount of impact energy absorbed by the support mechanism 20f.

TABLE 1

| EA Load | Large | Medium | Medium | Small |
|---|---|---|---|---|
| SOL1 | OFF | ON | OFF | ON |
| SOL2 | OFF | OFF | ON | ON |

As can be seen from Table 1, switching (ON/OFF) control of the solenoids 29a, 29b enables implementation of various modes of the support mechanism 20f absorbing different amounts of impact energy. Accordingly, appropriate switching (ON/OFF) control of the solenoids 29a, 29b enables optimization of the respective amounts of impact energy to be absorbed by the support mechanism 20f when the driver H does and does not fasten the seatbelt. Moreover, the amount of impact energy to be absorbed by the support mechanism 20f can be optimized in view of a physical constitution of the driver H (which is detected by the seated position sensor 93 of FIG. 1 or the weight sensor mounted in the driver's seat), vehicle speed and the like.

Figure 23:
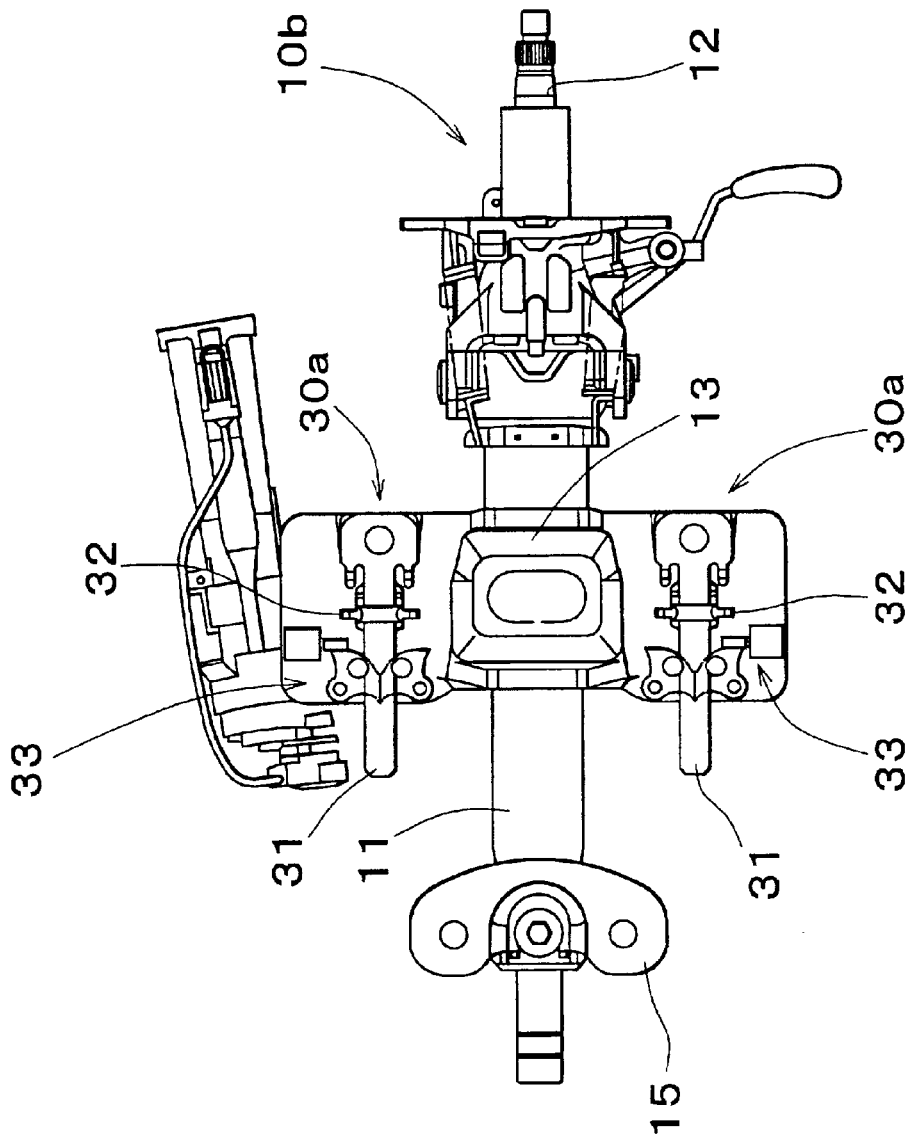
FIG. 23 is a plan view of a steering system having a support mechanism of a seventh exemplary embodiment of the invention mounted therein.
Figure 24:
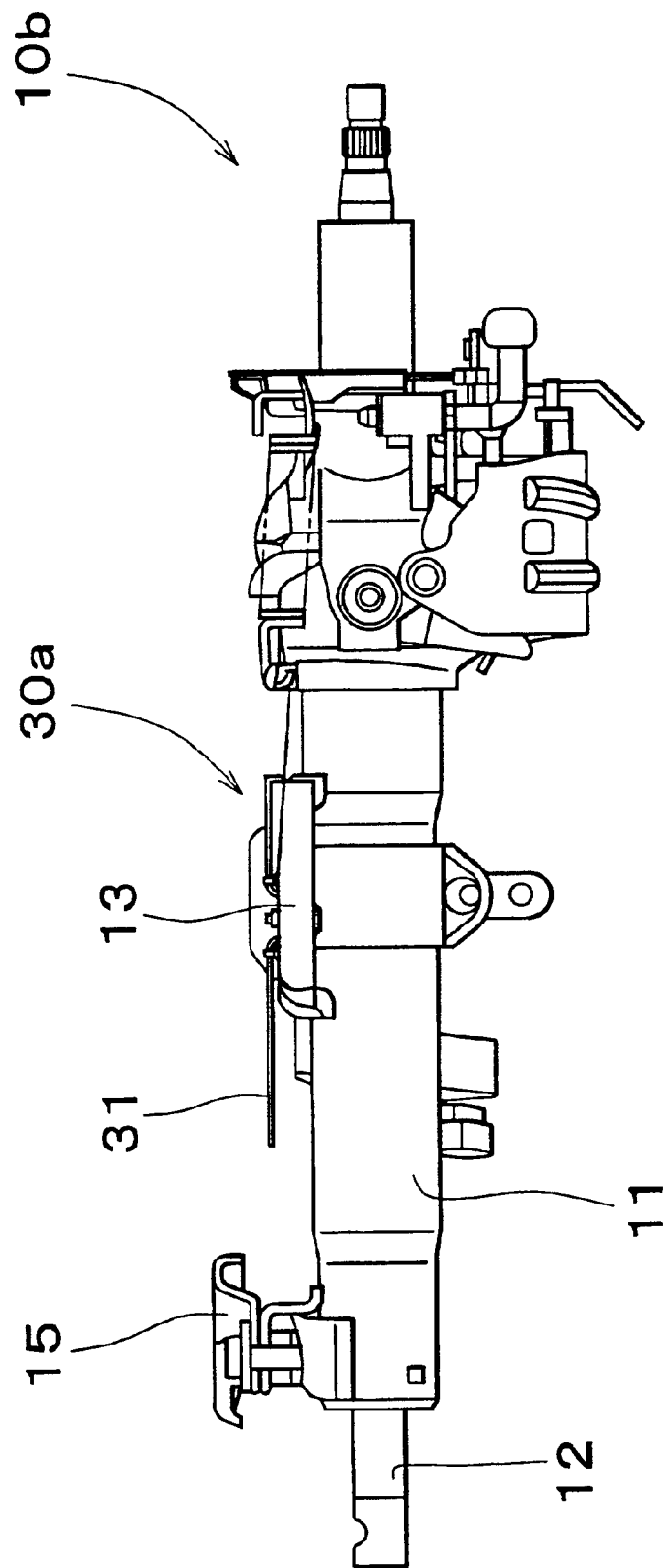
FIG. 24 is a side view of a steering system having the support mechanism of the seventh exemplary embodiment mounted therein.

FIGS. 23 and 24 show a steering system 10b employing a support mechanism 30a of a seventh exemplary embodiment as a second support mechanism of the invention. The steering system 10b includes a steering column 11 and a steering shaft 12 extending therethrough. The steering shaft 12 is supported within the steering column 11 so as to be rotatable in the circumferential direction.

In the steering system 10b, a front part of the steering column 11 is supported to a part of the vehicle body by the lower support bracket 15 so that the steering column 11 can break away therefrom in the forward direction. An intermediate part of the steering column 11 is supported to a part of the vehicle body by the upper support bracket 13 and a pair of right and left support mechanisms 30a. These support mechanisms 30a are mounted on both sides of the steering system 10b.

Each support mechanism 30a includes an energy absorbing plate 31 and a squeezing clip 32 like the known support mechanism disclosed in Japanese Patent Laid-Open Publication No. 8-295249 by the applicant. Each support mechanism 30a further includes a deformation characteristics changing device 33. The front end of the steering shaft 12 is coupled to a steering link mechanism (see the steering link mechanism 16 in FIG. 1), and a steering wheel (see the steering wheel 17 in FIG. 1) incorporating an airbag (see the airbag 18 in FIG. 1) is mounted to the rear end of the steering shaft 12.

Figure 25A:
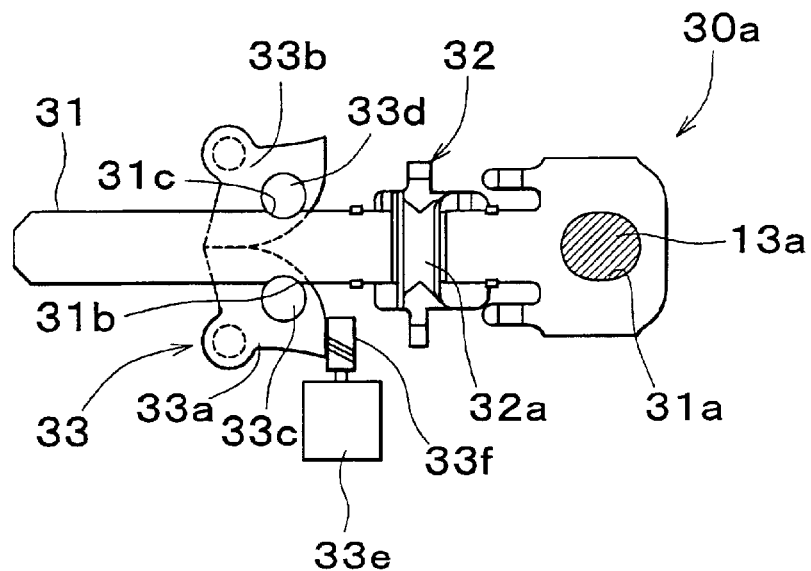
FIG. 25A is a plan view showing an initial state of the support mechanism of the seventh exemplary embodiment.
Figure 25B:
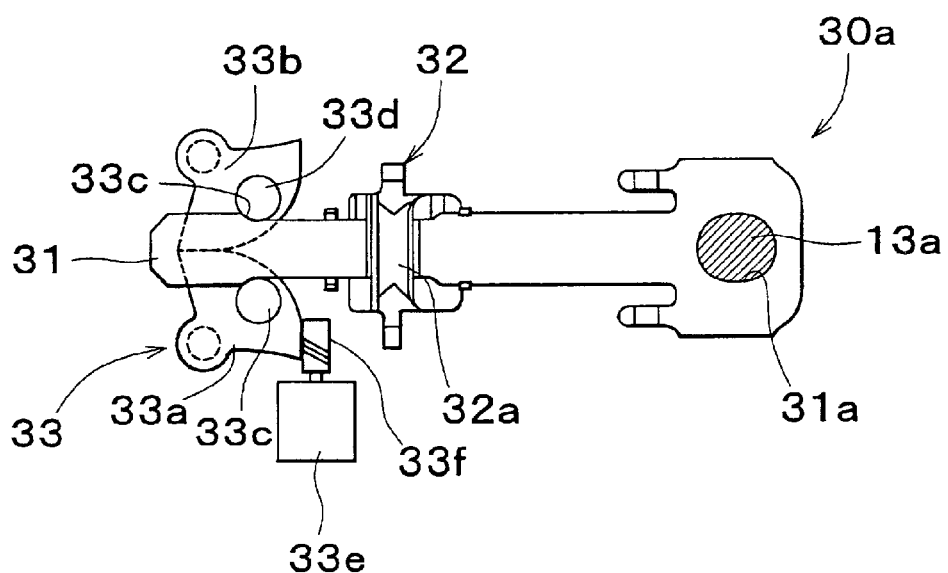
FIG. 25B is a plan view showing an operating state of the support mechanism of the seventh exemplary embodiment.

As shown in FIGS. 25A and 25B, the energy absorbing plate 31 is attached to the vehicle body with a bolt 13a inserted into a bolt insertion hole 31a formed at the rear end. The bolt 13a is used to attach the upper support bracket 13 serving as a breakaway bracket to the vehicle body. The squeezing clip 32 has a curved pressing portion 32a, and is mounted on the energy absorbing plate 31. In this state, the squeezing clip 32 is fixed to the upper support bracket 13. The squeezing clip 32 together with the upper support bracket 13 clips the energy absorbing plate 31 in the vertical direction. The squeezing clip 32 thus squeezes and deforms the energy absorbing plate 31 in the longitudinal direction while moving relative to the energy absorbing plate 31 upon collision of the vehicle.

When the driver H moves forward and interferes with the steering wheel 17 upon head-on collision of the vehicle, the steering system 10b supported by the supporting mechanisms 30a moves the steering shaft 12 and the steering column 11 forward together with the upper support bracket 13. The energy absorbing plates 31 constituting the support mechanisms 30a supporting the steering column 11 thus moves relative to the respective squeezing clips 32. While the energy absorbing plates 31 are moving relative to the respective squeezing clips 32, the squeezing clips 32 gradually squeeze the respective energy absorbing plates 31 in the longitudinal direction to absorb the impact energy. Accordingly, the support mechanisms 30a absorb the impact energy of the steering wheel 17 against the driver H, thereby reducing the impact force of the steering wheel 17 against the driver H.

Each support mechanism 30a includes a deformation characteristics changing device 33. As shown in FIGS. 25A and 25B, the deformation characteristics changing device 33 includes a pair of sector gears 33a, 33b, a pair of squeezing pins 33c, 33d, and an electric motor 33e for rotating the sector gears 33a, 33b. The pair of sector gears 33a, 33b are disposed on both sides of the energy absorbing plate 31 in the width direction thereof, and rotatably mounted to the upper support bracket 13. The pair of squeezing pins 33c, 33d are mounted to the respective sector gears 33a, 33b, and extend vertically on both sides of the energy absorbing plate 31 in the width direction thereof. A pinion 33f mounted at the output shaft of the motor 33e meshes with one sector gear 33a to allow power transmission from the motor 33e. The sector gears 33a, 33b mesh with each other, and are rotated in the opposite directions by the motor 33e.

FIG. 25A shows the initial state of the support mechanism 30a. In the initial state, the squeezing pins 33c, 33d of the deformation characteristics changing device 33 are fitted in arc-shaped recesses 31b, 31c formed at the side edges of the energy absorbing plate 31, respectively. When the driver H fastens the seatbelt 91 as illustrated in FIG. 1, the motor 33e rotates by a prescribed amount. The motor 33e thus rotates the sector gears 33a, 33b by a prescribed amount so as to separate the squeezing pins 33c, 33d away from the respective arc-shaped recesses 31b, 31c formed at the side edges of the energy absorbing plate 31.

The support mechanism 30a is in the same state as the initial state in FIG. 25A when the driver H does not fasten the seatbelt. Therefore, while the energy absorbing plate 31 is moving relative to the deformation characteristics changing device 33 relatively, both sides thereof are deformed by the squeezing force of the squeezing pins 33c, 33d. As shown in FIG. 25B, when the driver H does not fasten the seatbelt, the energy absorbing plate 31 relatively moves backward while being deformed by the squeezing clip 32, in response to the impact. At the same time, both side edges of the energy absorbing plate 31 are deformed by the squeezing force of the squeezing pins 33c, 33d of the deformation characteristics changing device 33. The support mechanism 30a thus absorbs a large amount of impact energy.

On the other hand, when the driver H fastens the seatbelt, the motor 33e drives the squeezing pins 33c, 33d away from the arc-shaped recesses 31b, 31c formed at the side edges of the energy absorbing plate 31. Therefore, the squeezing pins 33c, 33d will not apply any squeezing force to the side edges of the energy absorbing plate 31.

Accordingly, the energy absorbing plate 31 is stretched backward without being subjected to any deforming force from the squeezing pins 33c, 33d. The support mechanism 30a thus absorbs a smaller amount of impact energy as compared to the case where the driver H does not fasten the seatbelt.

Figure 26:
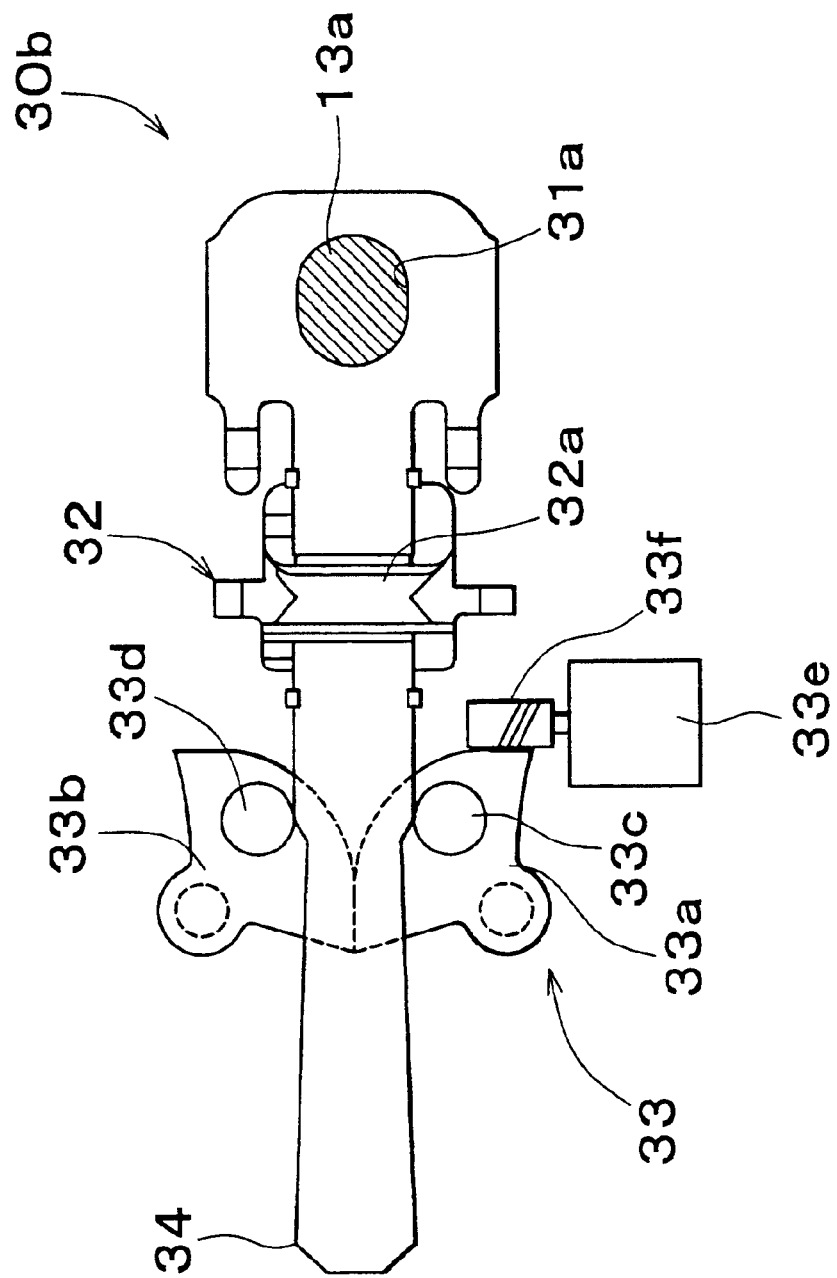
FIG. 26 is a plan view showing an initial state of a modification of the support mechanism of the seventh exemplary embodiment (a support mechanism of an eighth embodiment of the invention)

FIG. 26 shows a support mechanism 30b of an eighth exemplary embodiment as a second support mechanism of the invention. The support mechanism 30b is a modification of the support mechanism 30a of the seventh exemplary embodiment. The support mechanism 30b employs an energy absorbing plate 34 having its width gradually increased from the portion held by the squeezing pins 33c, 33d toward the front. This enables the energy absorbing plate 34 to be subjected to a gradually increasing squeezing force from the squeezing pins 33c, 33d while moving relative to the deformation characteristics changing device 33 relatively. As a result, the amount of impact energy absorbed by the support mechanism 30b can be increased gradually.

Figure 27:
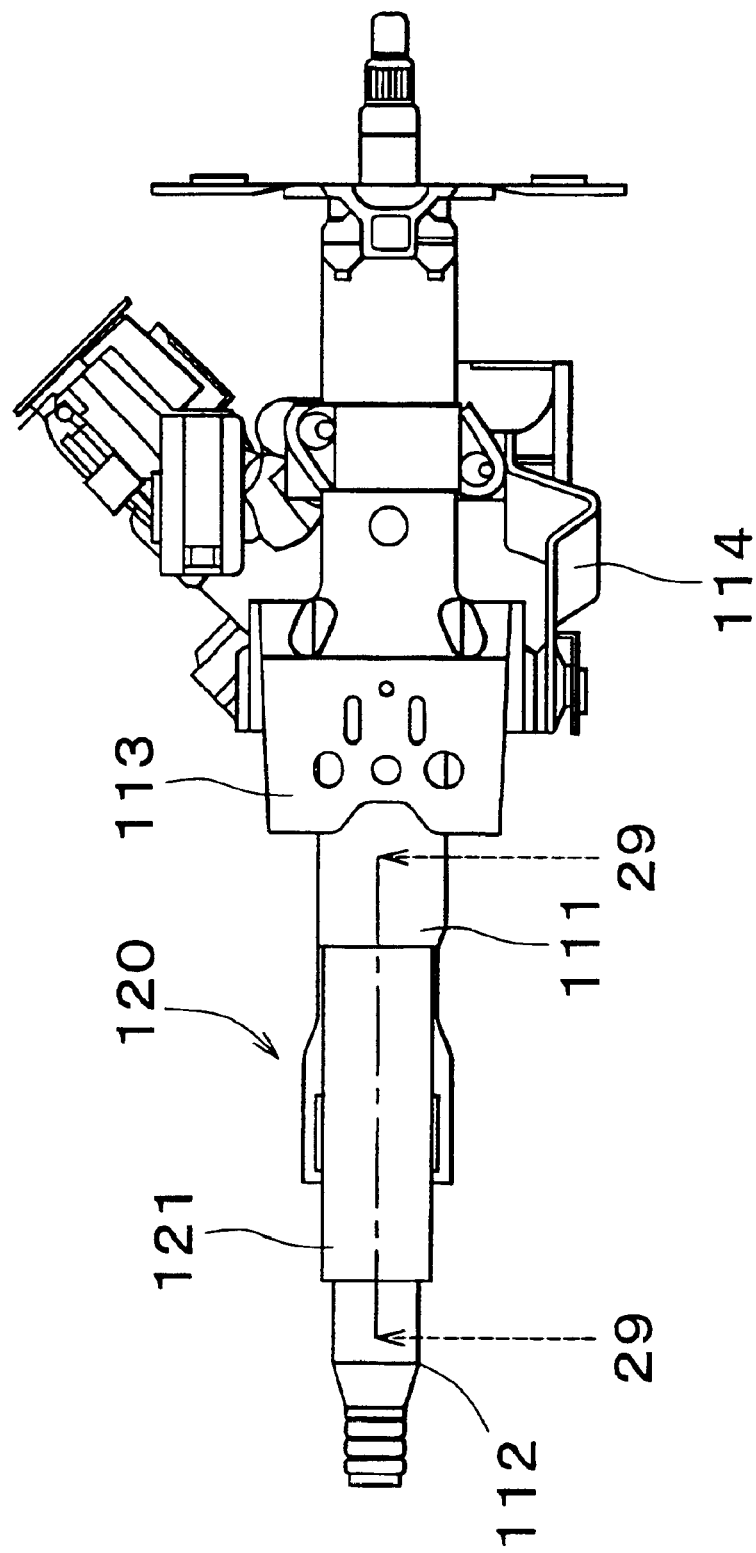
FIG. 27 is a plan view of a steering system having a support mechanism of a ninth exemplary embodiment of the invention mounted therein.
Figure 28:
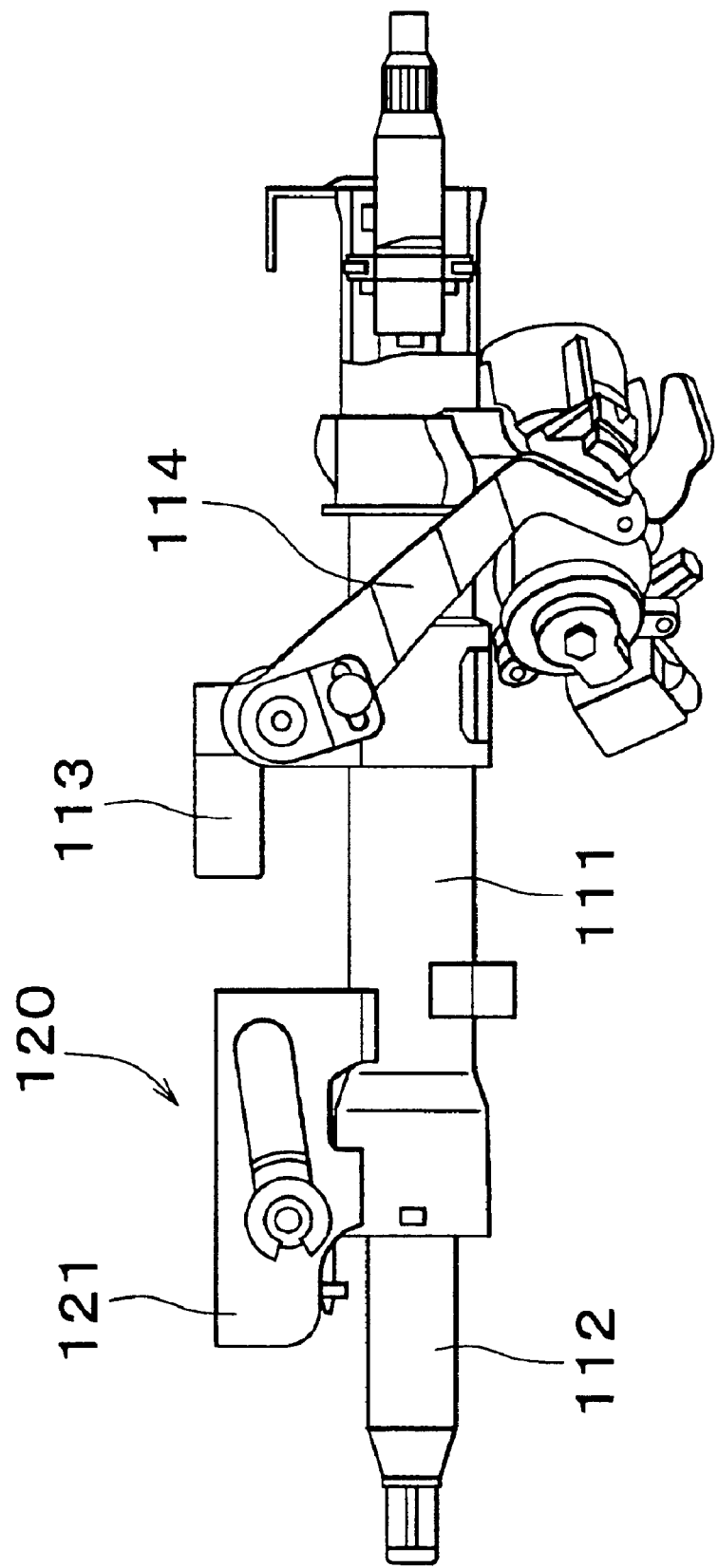
FIG. 28 is a side view of the steering system having the support mechanism of the ninth exemplary embodiment mounted therein.

FIGS. 27 and 28 show a steering system employing a support mechanism 120 of a ninth exemplary embodiment as a third support mechanism of the invention. This steering system includes a steering column 111 and a steering shaft 112 extending therethrough. The steering shaft 112 is supported within the steering column 111 so as to be rotatable in the circumferential direction.

In this steering system, a rear part of the steering column 111 is supported to a part of the vehicle body (not shown) by an upper support bracket 113. A front part of the steering column 111 is supported to a part of the vehicle (not shown) by the support mechanism 120. Like the first embodiment of FIG. 1, with the steering system being mounted in the vehicle, the front end of the steering shaft 112 is coupled to a steering link mechanism (see the steering link mechanism 16 in FIG. 1). A steering wheel (see the steering wheel 17 in FIG. 1) incorporating an airbag (see the airbag 18 in FIG. 1) is mounted to the rear end of the steering shaft 112.

Note that the upper support bracket 113 is mounted to a part of the vehicle, and supports the steering column 111 so that the steering column 111 can break away therefrom in the forward direction. The upper support bracket 113 allows the steering column 111 to break away therefrom in the forward direction of the vehicle when a prescribed load is applied to the steering column 111 in the forward direction. The upper support bracket 113 has a tilt lock mechanism. FIGS. 27 and 28 show an operation lever 114 for operating the lock mechanism for locking and unlocking.

Figure 29:
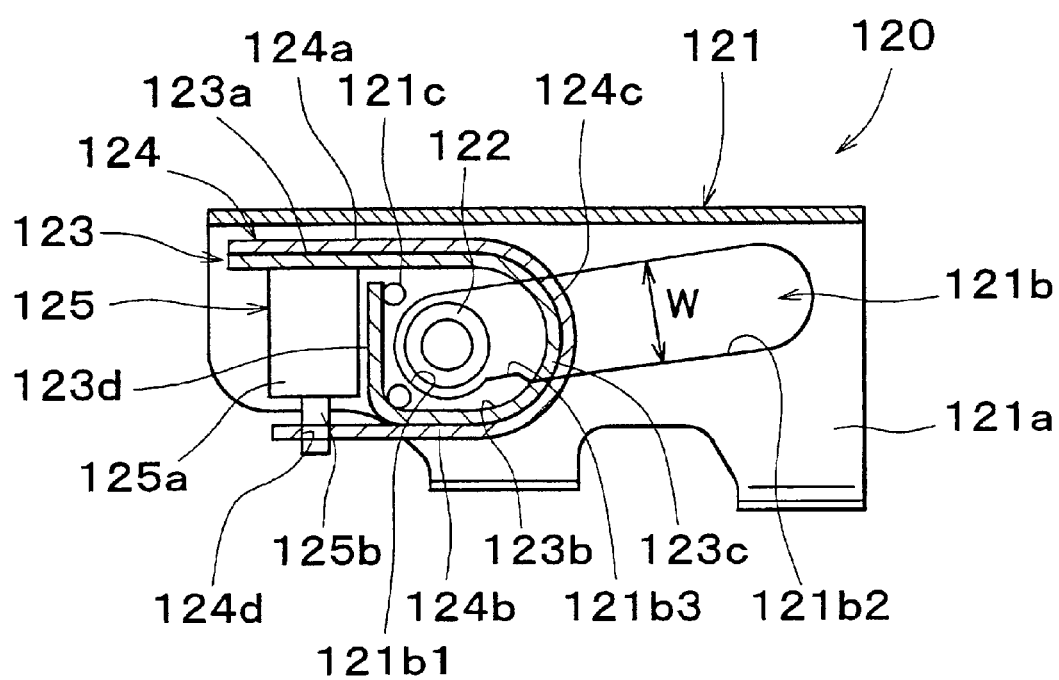
FIG. 29 is an enlarged sectional side elevation of the support mechanism of the ninth exemplary embodiment taken along line 29—29 in FIG. 27.
Figure 30:
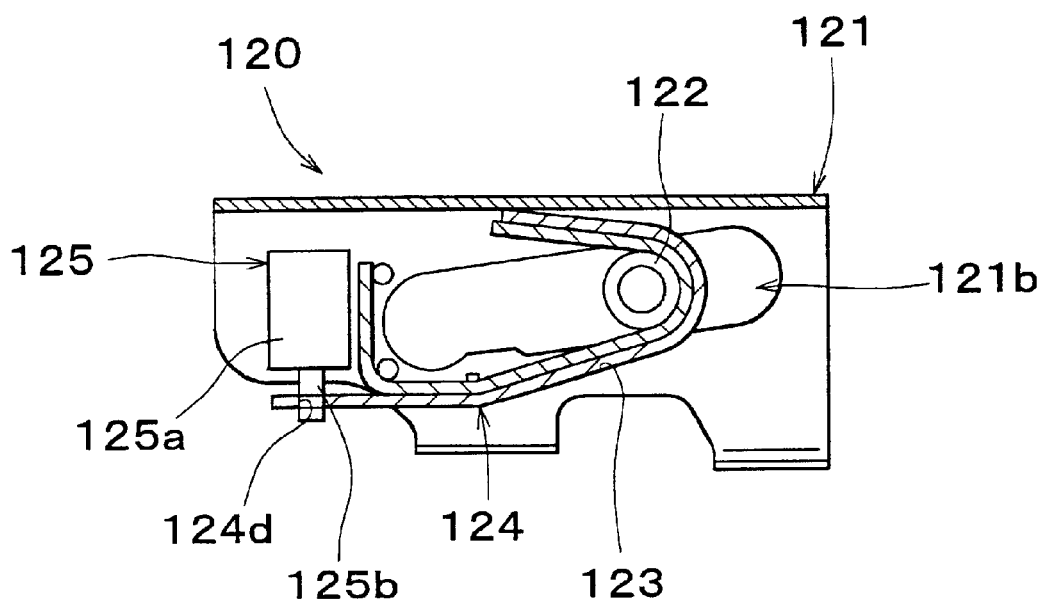
FIG. 30 is a sectional side elevation showing an operating state of the support mechanism of the ninth exemplary embodiment when the driver does not fasten the seatbelt.
Figure 31:
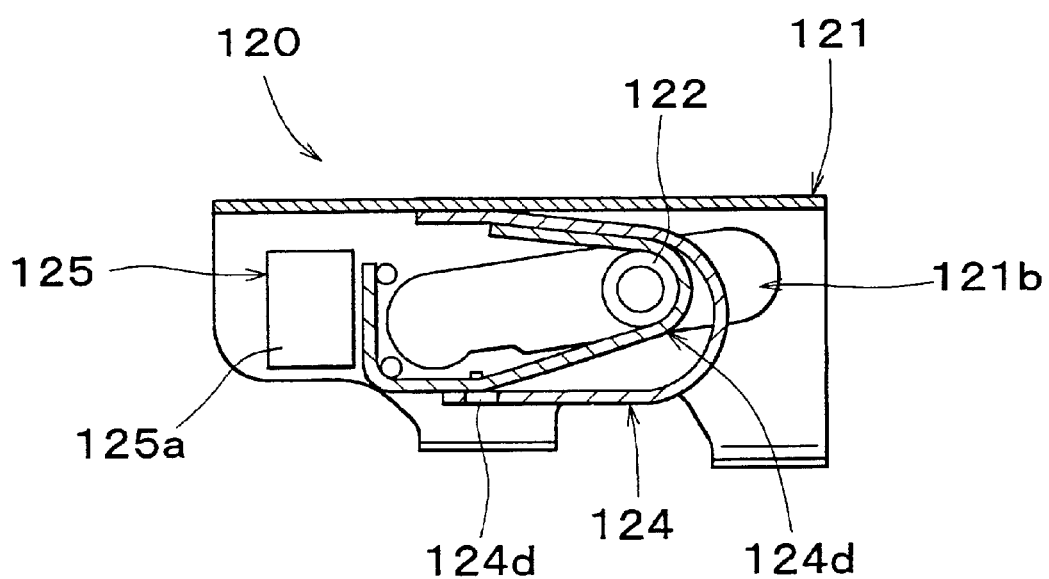
FIG. 31 is a sectional side elevation showing an operating state of the support mechanism of the ninth exemplary embodiment when the driver fastens the seatbelt.

As shown in FIGS. 29 to 31, the support mechanism 120 includes a support bracket 121 as a support member, a support pin 122, a first bent plate 123 as a first energy absorbing member, a second bent plate 124 as a second energy absorbing member, and an engaging device 125 as an engaging/disengaging device.

The support bracket 121 has a portal shape and is long sideways when viewed longitudinally. The support bracket 121 has sidewalls 121a facing each other, and a long hole 121b is formed in each of the sidewalls 121a so that the respective long holes 121b face each other. Each long hole 121b extends backward from a position somewhat ahead of the center of the sidewall 121a in the obliquely upward direction. Each long hole 121b includes a circular hole portion 121b1 as a base end (front end), an elongated hole portion 121b2 extending backward from the circular hole portion 121b1 in the obliquely upward direction, and a narrowed portion 121b3 connecting the hole portions 121b1, 121b2 together. The elongated hole portion 121b2 has approximately the same width W as the diameter of the circular hole portion 121b1. The support bracket 121 is fixed to the upper portion of the outer periphery of the steering column 111 at the respective lower ends of both sidewalls 121a.

The support pin 122 is mounted to a not-shown bracket disposed at a part of the vehicle body, and extends through the long holes 121b of the support bracket 121. In this state, the support pin 122 supports the front end of the steering column 111 to a part of the vehicle body through the support bracket 121 so that the steering column 111 is pivotable in the upward direction. The support pin 122 initially extends through the circular hole portions 121b1 of the long holes 121b of the support bracket 121. By moving relative to the support bracket 121, the support pin 122 moves backward within the elongated hole portions 121b2 beyond the narrowed portions 121b3.

The first bent plate 123 has a prescribed width and is bent by approximately 270 degrees. The first bent plate 123 includes an upper wall portion 123a, a lower wall portion 123b, an arc-shaped wall portion 123c and a vertical wall portion 123d. The upper wall portion 123a and the lower wall portion 123b face each other at a prescribed distance. The arc-shaped wall portion 123c connects the wall portions 123a, 123b together. The vertical wall portion 123d extends perpendicularly from the end of the lower wall portion 123b. The first bent plate 123 is positioned by a plurality of pins 121c arranged to surround the outer periphery of the circular hole portions 121b1 of the long holes 21b in the sidewalls 121a of the support bracket 121. In this state, the first bent plate 123 is fixedly welded to the support bracket 121. The first bent plate 123 surrounds the support pin 122 within the support bracket 121. The vertical wall portion 123d is located ahead of the support pin 122, and the arc-shaped wall portion 123c is located behind the support pin 122 and extends across the elongated hole portions 121b2 of the long holes 121b.

The second bent plate 124 has a prescribed width and is bent by approximately 270 degrees. The second bent plate 124 is sized to fit the first bent plate 123 therein. The second bent plate 124 includes an upper wall portion 124a, a lower wall portion 124b and an arc-shaped wall portion 124c. The upper wall portion 124a and the lower wall portion 124b face each other at a prescribed distance. The arc-shaped wall portion 124c connects the wall portions 124a, 124b together. The lower wall portion 124b has an engaging hole 124d at its front end. The second bent plate 124 is disposed within the support bracket 121, and contacts the outer periphery of the first bent plate 123 in a separable manner.

The engaging device 125 includes a solenoid 125a and an engaging pin 125b. The engaging pin 125b advances and retreats according to whether current is applied to the solenoid 125a. The engaging device 125 is disposed in a front portion within the support bracket 121. The engaging pin 125b faces the engaging hole 124d of the second bent plate 124. When the solenoid 125a of the engaging device 125 carries current, the engaging pin 125b advances into the engaging hole 124d of the second bent plate 124. When the solenoid 125a no longer carries current, the engaging pin 125b retreats away from the engaging hole 124d of the second bent plate 124.

Accordingly, the front end of the second bent plate 124 is fixed to the support bracket 121 when the solenoid 125a carries current, and is disengaged from the support bracket 121 when the solenoid 125a carries no current. Current is applied to the solenoid 125a upon starting of the engine. While the driver H does not fasten the seatbelt (like the embodiment shown in FIG. 1, whether the driver H fastens the seatbelt is detected by the sensor 92 mounted in the driver's seatbelt 91), an electrical control unit ECU continues to apply current to the solenoid 125a, as in the embodiment shown in FIG. 1. Once the driver H fastens the seatbelt 91, the electrical control unit ECU discontinues current application to the solenoid 125a, as in the embodiment shown in FIG. 1. Note that application and non-application of current to the solenoid 125a may be implemented in the manner opposite to that described above.

When the driver H moves forward and interferes with the steering wheel 17 upon a head-on collision of the vehicle, the steering system including such a support mechanism 120 moves the steering shaft 112 and the steering column 111 forward. The support pin 122 of the support mechanism 120 supporting the steering column 111 thus moves backward within the long holes 121b of the support bracket 121 with a force corresponding to the impact force. While moving backward, the support pin 122 stretches the first bent plate 123 to absorb the impact energy. The support mechanism 120 thus absorbs the impact energy of the steering wheel 17 against the driver H, thereby reducing the impact force of the steering wheel 17 against the driver H.

When the driver H does not fasten the seatbelt (i.e., when the predicted impact force applied from the steering column to the driver H is large), the solenoid 125a constituting the engaging device 125 carries current. The engaging pin 125b therefore advances into the engaging hole 124d of the second bent plate 124, as shown in FIG. 29. The second bent plate 124 is thus fixed to the support bracket 121. On the other hand, when the driver H fastens the seatbelt (when the predicted impact force applied from the steering column to the driver H is small), the solenoid 125a constituting the engaging device 125 carries no current. The engaging pin 125b therefore retreats from the engaging hole 124d of the second bent plate 124. The second bent plate 124 is thus disengaged from the support bracket 121.

As shown in FIG. 30, when the driver H does not fasten the seatbelt, the support pin 122 moves backward while stretching both first and second bent plates 123, 124, in response to the impact. The support mechanism 120 thus absorbs a large amount of impact energy. As shown in FIG. 31, when the driver H fastens the seatbelt, the support pin 122 moves backward while stretching only the first bent plate 123, in response to the impact. In other words, the support pin 122 does not stretch the second bent plate 124. The support mechanism 120 thus absorbs a smaller amount of impact energy as compared to the case where the driver H does not fasten the seatbelt.

The support mechanism 120 is thus capable of changing the absorption amount of impact energy according to whether the driver H fastens the seatbelt or not (i.e., according to the predicted impact force applied from the steering column to the driver H). The support mechanism 120 makes good use of the structure of a support mechanism that is essential for supporting the steering system to a part of the vehicle body. Accordingly, the support mechanism 120 can be inexpensively manufactured with a relatively simple structure without complicating the structure of the steering system. As a result, increase in costs can be significantly suppressed.

FIGS. 32 to 34B show a support mechanism 130 of a tenth exemplary embodiment as a third support mechanism of the invention. Like the support mechanism 120 of the ninth exemplary embodiment, the support mechanism 130 serves to support a front part of the steering column 111 to a part of the vehicle body.

The support mechanism 130 includes a pair of right and left support brackets 131 as support members, a support pin 132, a bent plate 133 as an energy absorbing member, a cam 134, an electric motor 135 as a driving device, and a fixed bracket 136 for supporting the cam 134 and the electric motor 135.

Each support bracket 131 has a sidewall 131a. Each sidewall 131a has a long hole 131b extending backward from an anterior position in the obliquely upward direction. The long hole 131b includes a circular hole portion 131b1 as a base end (front end), and an elongated hole portion 131b2 extending backward from the circular hole portion 131b1 in the obliquely upward direction. The circular hole portion 131b1 has a diameter larger than the width of the elongated hole portion 131b2. Each support bracket 131 is fixed to the upper portion of the outer periphery of the steering column 111 at their respective lower ends.

The support pin 132 is mounted to the fixed support bracket 136 so as to extend through the long holes 131b of the support brackets 131. The fixed support bracket 136 is fixed to a part of the vehicle body. In this state, the support pin 132 supports the front end of the steering column 111 to a part of the vehicle body through the support brackets 131 so that the steering column 111 is pivotable in the vertical direction. The support pin 132 initially extends through the circular hole portions 131b1 of the long holes 131b of the support brackets 131. By moving relative to the support bracket 131, the support pin 132 moves backward within the elongated hole portions 131b2.

The bent plate 133 has a prescribed width and is bent by approximately 270 degrees. The bent plate 133 includes an upper wall portion 133a, a lower wall portion 133b, an arc-shaped wall portion 133c and a vertical wall portion 133d. The upper wall portion 133a and the lower wall portion 133b face each other at a prescribed distance. The arc-shaped wall portion 133c connects the wall portions 133a, 133b together. The vertical wall portion 133d extends perpendicularly from the end of the lower wall portion 133b.

The bent plate 133 is disposed between the support plates 131, and the lower wall portion 133b thereof is fixed to the upper portion of the outer periphery of the steering column 111. The bent plate 133 surrounds the cam 134 that is mounted on the intermediate portion of the support pin 132. The arc-shaped wall portion 133c is located behind the cam 134 and extends across the elongated hole portions 131b2 of the long holes 131b.

Figure 34A:
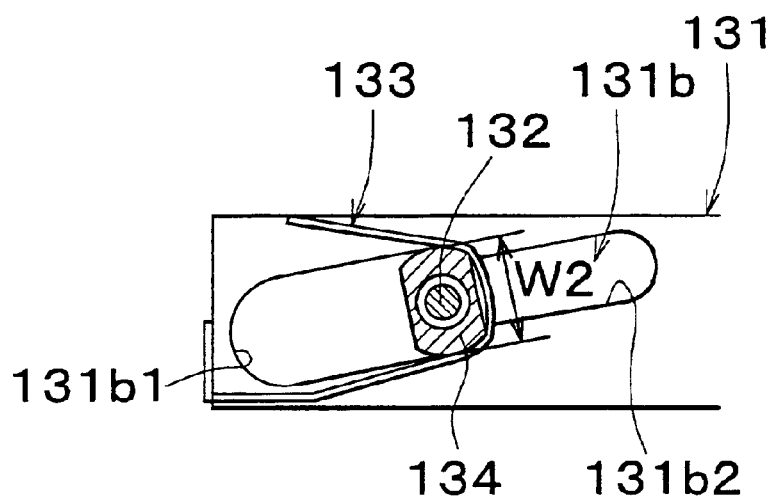
FIG. 34A is a sectional side elevation showing an operating state of the support mechanism of the tenth exemplary embodiment when the driver does not fasten the seatbelt.

The cam 134 is a rectangular block with arc-shaped front and rear ends. The cam 134 is rotatably mounted to the outer periphery of the support pin 132. As shown in FIG. 34A, the width W2 between one of the pairs of opposing surfaces of the cam 134 is slightly smaller than the diameter of the circular hole portion 131b1 of the long hole 131b in each support bracket 131, and is larger than the width of the elongated hole portion 131b2. The width W1 between the other pair of opposing surfaces of the cam 134 is slightly smaller than the width of the elongated hole portion 131b2 of the long hole 131b in each support bracket 131.

Figure 32:
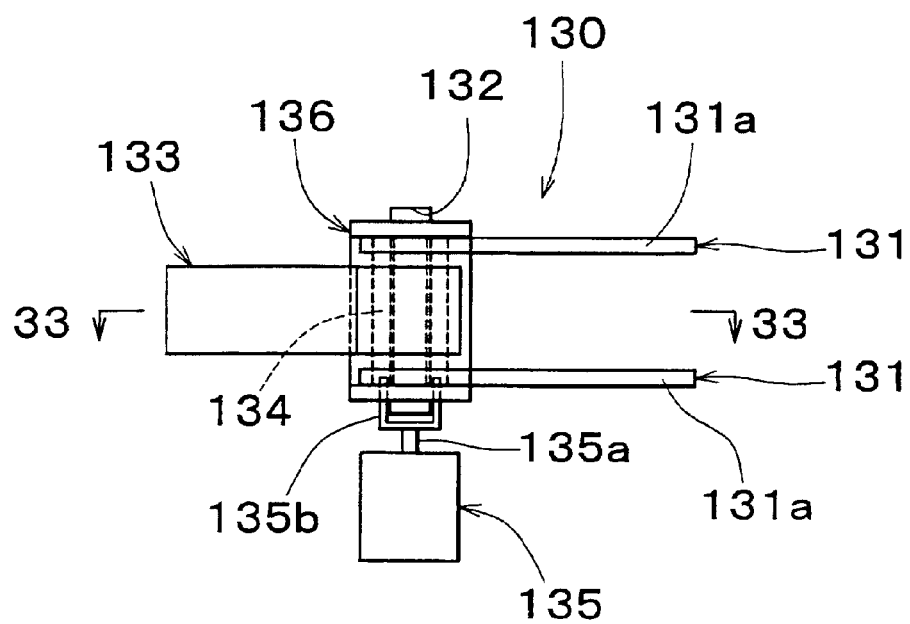
FIG. 32 is a bottom view of a support mechanism of a tenth exemplary embodiment of the invention.
Figure 33:
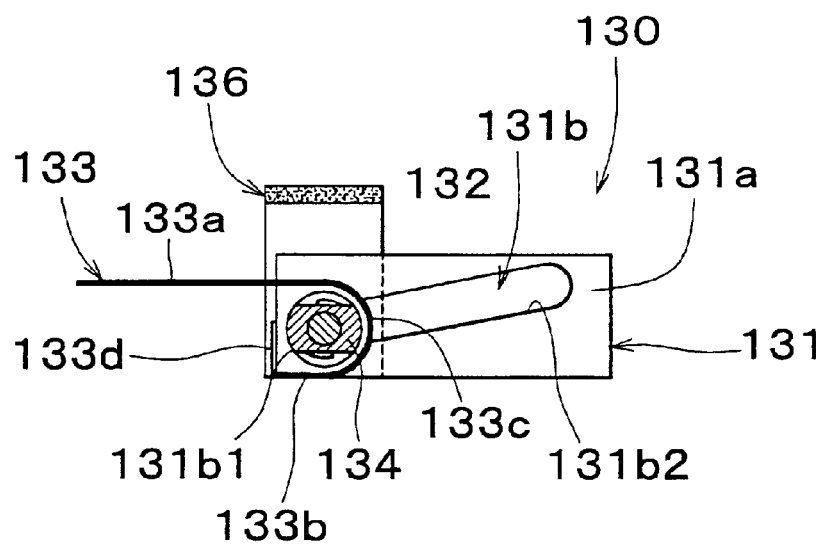
FIG. 33 is a sectional side elevation taken along lines 33—33 in FIG. 32.
Figure 34B:
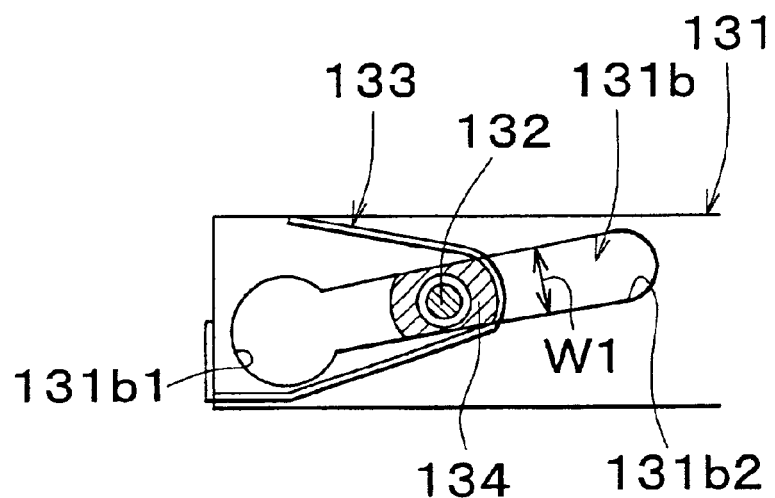
FIG. 34B is a sectional side elevation showing an operating state of the support mechanism of the tenth exemplary embodiment when the driver fastens the seatbelt.

The electric motor 135 rotates the cam 134 to change the width of the cam 134 facing the width of the elongated hole portion 131b2 of the long hole 131b. As shown in FIG. 32, the electric motor 135 is connected to the side surface of the cam 134 by a forked connecting portion 135b formed at the tip of an output shaft 135a. When the driver H unfastens the seatbelt, the electric motor 135 rotates by a prescribed amount to rotate the cam 134 by approximately 90 degrees. The electric motor 135 thus rotates the cam 134 as shown in FIG. 34A when the driver H does not fasten the seatbelt, and rotates the cam 134 as shown in FIG. 34B when the driver H fastens the seatbelt.

When the driver H moves forward and interferes with the steering wheel upon head-on collision of the vehicle, the steering system supported by such a support mechanism 130 moves the steering shaft 112 and the steering column 111 forward. As a result, both the support pin 132 of the support mechanism 130 supporting the steering column 111 and the cam 134 relatively move backward within the long holes 131b of the support brackets 131 with a force corresponding to the impact force. While the support pin 132 and the cam 134 are moving relatively, the cam 134 stretches the bent plate 133 to absorb the impact energy. The support mechanism 130 thus absorbs the impact energy of the steering wheel against the driver H, thereby reducing the impact force of the steering wheel against the driver H.

When the driver H does not fasten the seatbelt, the electric motor 135 rotates the cam 134 as shown in FIG. 34A. Upon collision, the cam 134 moves backward together with the support pin 132 while deforming the bent plate 132 and successively deforming the upper and lower side edges of the elongated hole portions 131b2 of the long holes 131b. The support mechanism 130 thus absorbs a large amount of impact energy. On the other hand, when the driver H fastens the seatbelt, the electric motor 135 rotates the cam 134 as shown in FIG. 34B. Upon collision, the cam 134 relatively moves backward together with the support pin 132 while merely deforming the bent plate 132. In other words, the cam 134 passes through the elongated hole portions 131b2 of the long holes 131b without deforming the upper and lower side edges of the elongated hole portions 131b2. The support mechanism 130 thus absorbs a small amount of impact energy.

Like the support mechanism 120 of the ninth exemplary embodiment, the support mechanism 130 is capable of changing the absorption amount of impact energy according to whether the driver H fastens the seatbelt or not (i.e., according to the predicted impact force applied from the steering column to the driver H). The support mechanism 130 makes good use of the structure of a support mechanism that is essential for supporting the steering system to a part of the vehicle body. Accordingly, the support mechanism 130 has the same effects as those of the support mechanism 120 of the ninth exemplary embodiment. Note that, in the support mechanism 130, the electric motor 135 rotates the cam 134 by approximately 90 degrees. However, the electric motor 135 may rotate the cam 134 in multiple stages by, e.g., approximately 45 or 90 degrees.

The support mechanism 20a of the first exemplary embodiment employs the solenoid 24a as a driving device. The support mechanism 20b of the second exemplary embodiment employs the solenoid 25a as a driving device. The support mechanism 20c of the third exemplary embodiment employs the solenoid 26c as a driving device. The support mechanism 20d of the fourth exemplary embodiment employs the electric motor 27a as a driving device. The support mechanism 20f of the sixth exemplary embodiment employs the solenoids 29a, 29b as a driving device. The support mechanism 30a of the seventh exemplary embodiment and the support mechanism 30b of the eighth embodiment employ the electric motor 33e as a driving device. The support mechanism 120 of the ninth exemplary embodiment employs the solenoid 125a as a driving device. The support mechanism 130 of the tenth exemplary embodiment employs the electric motor 135 as a driving device. However, the above driving device may be changed as necessary.

In each of the above exemplary embodiments, the energy absorbing characteristics of the variable energy absorbing mechanism (the energy absorbing mechanism having the deformation characteristics changing device) included in each support mechanism vary according to whether the driver fastens the seatbelt. However, the energy absorbing characteristics of the energy absorbing mechanism capable of changing an energy absorption amount (the energy absorbing mechanism having the deformation characteristics changing device) included in each support mechanism may vary according to whether the driver fastens the seatbelt and the seated position of the driver (more specifically, if the driver does not fasten the seatbelt, the variable energy absorbing mechanism may absorb a larger amount of energy in the case where the seated position of the driver is ahead of or behind a preset position as compared to the case where the seated position is the preset position).

In this case, whether the driver H fastens the seatbelt is detected by the sensor 92 illustrated in FIG. 1, and the seated position of the driver H is detected by the seated position detecting sensor 93 illustrated in FIG. 1. Therefore, the sensors 92, 93 of FIG. 1 are capable of detecting that the driver does not fasten the seatbelt and the seated position of the driver is the preset position (i.e., the driver H with a standard constitution as shown by solid line in FIG. 1 does not fasten the seatbelt). The sensors 92, 93 are also capable of detecting that the driver does not fasten the seatbelt and the seated position of the driver is ahead of the preset position (i.e., the driver Hf with a poor constitution as shown by phantom line in FIG. 1 does not fasten the seatbelt). The sensors 92, 93 are also capable of detecting that the driver does not fasten the seatbelt and the seated position of the driver is behind the preset position (i.e., the driver Hr with a good constitution as shown by phantom line in FIG. 1 does not fasten the seatbelt).

Accordingly, when the driver does not fasten the seatbelt and the seated position of the driver is the preset position, each of the above support mechanisms provides the same effect as that provided when the driver fastens the seatbelt (i.e., the support mechanism absorbs a small amount of impact energy). When the driver does not fasten the seatbelt and the seated position of the driver is ahead of or behind the preset position, each of the above support mechanisms provides the same effect as that obtained when the driver does not fasten the seatbelt (i.e., the support mechanism absorbs a large amount of impact energy).

As a result, even if the driver Hf with a poor constitution as shown by phantom line in FIG. 1 does not fasten the seatbelt and the airbag 18 mounted in the steering wheel 17 does not work well upon head-on collision of the vehicle, each of the above support mechanisms accurately reduces the impact force of the steering wheel 17 against the driver Hf. Moreover, if the driver Hr with a good constitution as shown by phantom line in FIG. 1 does not fasten the seatbelt, the airbag 18 mounted in the steering wheel 17 and each of the above support mechanisms accurately reduce the impact force of the steering wheel 17 against the driver Hr (the impact force larger than that applied to the driver H with a standard constitution) upon head-on collision of the vehicle.

In each of the support mechanisms of the above embodiments, the airbag 18 is mounted in the steering wheel 17 as illustrated in FIG. 1 so that the impact energy is absorbed also by the airbag 18 upon head-on collision of the vehicle. This enables reduction in the preset energy absorption amount of the variable energy absorbing mechanism mounted on the side of at least one of the steering column and the vehicle body in the support mechanism, and thus enables reduction in size of the energy absorbing mechanism (i.e., reduction in size in the longitudinal direction of the vehicle, that is, in the relative movement direction).

The support mechanisms according to the embodiments of the invention are thus capable of changing the absorption amount of impact energy according to the predicted impact force applied from the steering column to the driver. The support mechanisms make good use of the structure of a support mechanism that is essential for supporting the steering system to a part of the vehicle body. Accordingly, the support mechanisms can be inexpensively manufactured with a relatively simple structure without complicating the structure of the steering system. As a result, increase in costs can be significantly suppressed. (US)

In all the embodiments, note that, in addition to whether the driver fastens the seatbelt, the predicted impact force may be calculated based on the signals from various sensors for detecting the vehicle speed, physical constitution of the driver and the like (e.g., a seated position sensor mounted in the driver's seat for detecting the seated position of the driver, or a weight sensor) (the predicted impact force is always calculated during running of the vehicle). These modified embodiments achieved the following object.

It is the object to provide a simplified support mechanism of a steering system that is capable of absorbing a different amount of impact energy according to a predicted impact force obtained based on whether the driver fastens the seatbelt, vehicle speed, physical constitution of the driver and the like, and that does not cooperate with an airbag mounted in a steering wheel.

A first aspect for achieving this object relates to a support mechanism of a steering system, and more particularly, relates to a support mechanism of a steering system for supporting, to a part of a vehicle body, a steering column that supports a steering shaft so that the steering shaft is rotatable in a circumferential direction. The support mechanism according to the first aspect includes a support member fixed to the steering column, a support pin extending through a longitudinal long hole in the support member, and attached to a part of the vehicle body to support the steering column to the vehicle body through the support member, an energy absorbing member mounted in the support member, and first and second energy absorbing members that are capable of being deformed by the support pin when the support pin moves relative to the long hole within the long hole. The first and the second energy absorbing members are provided with the support member. The support pin deforms the first energy absorbing member when the predicted impact force is smaller than a predetermined value, and deforms the first and the second energy absorbing member simultaneously when the predicted impact force is equal to or is larger than the predetermined value.

In the first support mechanism of the first aspect, the first energy absorbing member may be a first bent plate whose one end is fixed to the support member, and which longitudinally extends and is bent behind the support pin extending through the long hole. The second energy absorbing member may be a second bent plate whose one end is detachably fixed to the support member by an actuator, and which longitudinally extends and is bent behind the support pin extending through the long hole. In this case, when the second bent plate is not fixed to the supporting member by actuator, the support pin stretches the first bent plate while moving backward upon collision. In other words, the support pin does not stretch the second bent plate. Therefore, a relatively small amount of impact energy is absorbed. On the other hand, when the second bent plate is not fixed to the supporting member by actuator, the support pin stretches both first and second bent plates simultaneously while moving backward upon collision. Therefore, a large amount of impact energy is absorbed.

The actuator that engages and disengages one end of the second bent plate disengages the second bent plate from the support member when the predicted impact force is smaller than a predetermined value, and fixes the second bent plate to the support member when the predicted impact force is larger than or equal to the predetermined value.

In the second support mechanism of the first aspect, the first energy absorbing member is a bent plate whose one end is fixed to the support member, and which longitudinally extends and is bent behind the support pin extending through the long hole. The second energy absorbing member is a support member having the long hole. The second support mechanism includes a cam located in a large-width portion of the long hole and capable of moving within a small-width portion of the long hole, the large-width portion being located at a base end of the long hole, and a driving device that rotates the cam so as to selectively change a width of the cam facing the small-width portion of the long hole to a value larger or smaller than a width of the small-width portion of the long hole. When the width of the cam facing the width of the small-width portion of the long hole is smaller than that of the small-width portion, the support pin can stretch the bent plate while relatively moving backward within the long hole of the support member. When the width of the cam facing the small-width portion of the long hole is larger than that of the small-width portion, the support pin can stretch the bent plate and successively deform a side edge of the small-width portion of the long hole by using the cam while moving backward within the long hole of the support member.

In this case, the driving device can operate so that the width of the cam facing the small-width portion of the long hole becomes smaller than that of the small-width portion when the predicted impact force is smaller than a predetermined value, and operate so that the width of the cam facing the small-width portion of the long hole becomes larger than that of the small-width portion when the predicted impact force is larger than or equal to the predetermined value. This driving device may be an electric motor.

In the steering system supported by the basic support mechanism of the first aspect, the driver may move forward and interfere with a steering wheel to move the steering column forward upon head-on collision of the vehicle. In this case, the support pin supporting the steering column relatively moves backward within the long hole of the support member with a force corresponding to the impact force. While moving relatively, the support pin deforms the first energy absorbing member to absorb the impact energy in the energy absorbing member, thereby reducing the impact force of the steering wheel against the driver.

In this case, when the predicted impact force is equal to or is larger than the predetermined value, e.g., when the driver does not fasten the seatbelt, one end of the second energy absorbing member is fixed to the support member. Therefore, the support pin deforms the second energy absorbing member simultaneously with the first energy absorbing member. As a result, a large amount of energy is absorbed. On the other hand, when the predicted impact force is smaller than the predetermined value e.g., when the driver fastens the seatbelt, the second energy absorbing member is not fixed to the support member. Therefore, the support pin does not deform the second energy absorbing member. As a result, a smaller amount of energy is absorbed as compared to the case where the predicted impact force is larger than or equal to the predetermined value.

In the first support mechanism of the first aspect, the second bent plate is disengaged from the support member when the predicted impact force is smaller than the predetermined value, and is fixed to the support member when the predicted impact force is larger than or equal to the predetermined value. Therefore, when the predicted impact force is smaller than the predetermined value, the support pin stretches only the first bent plate moves backward upon collision. In other words, the support pin does not stretch the second bent plate. Therefore, a relatively small amount of impact energy is absorbed. On the other hand, when the predicted impact force is larger than or equal to the predetermined value, the support pin stretches both first and second bent plates simultaneously while moving backward upon collision. Therefore, a large amount of impact energy is absorbed.

In the second support mechanism of the first aspect, when the predicted impact force is smaller than the predetermined value, the width of the cam facing the small-width portion of the long hole in the support member is smaller than that of the small-width portion. On the other hand, when the predicted impact force is larger than or equal to the predetermined value, the width of the cam facing the small-width portion of the long hole in the support member is larger than that of the small-width portion. Therefore, when the predicted impact force is smaller than the predetermined value, the cam of the support pin merely stretches the bent plate while relatively moving backward upon collision. A relatively small amount of impact energy is thus absorbed. On the other hand, when the predicted impact force is larger than or equal to the predetermined value, the cam of the support pin not only stretches the bent plate but also successively deforms the side edge of the small-width portion of the long hole in the support member while relatively moving backward upon collision. Accordingly, a larger amount of impact energy is absorbed as compared to the case where the driver fastens the seatbelt.

A second aspect for achieving the object relates to a support mechanism of a steering system, and more particularly, relates to a support mechanism of a steering system for supporting, to a part of a vehicle body, a steering column that supports a steering shaft so that the steering shaft is rotatable in a circumferential direction. The support mechanism according to the second aspect includes an energy absorbing member mounted on a side of the steering column or the vehicle body, deforming member that deforms the energy absorbing member when the deforming member relatively moves relative to the vehicle body, and an actuator that changes an amount of a deforming action on the energy absorbing member. The actuator is mounted on a side of the steering column or the vehicle body.

In the first support mechanism according to the second aspect, the energy absorbing mechanism may include a support member fixed to the steering column, a support pin extending through a longitudinal long hole in the support member, and attached to a part of the vehicle body to support the steering column to the vehicle body through the support member, an energy absorbing members mounted in the support member, and capable of being deformed by the support pin when the support pin relatively moves relative to the long hole within the long hole, and an actuator that changes the amount of the deforming action on the energy absorbing member. The predicted impact force is always calculated during running of the vehicle on the basis of output signal from various sensors that detects e.g., a seated position sensor mounted in the driver's seat for detecting the seated position of the driver, or a weight sensor. The actuator reduces the amount of the deforming action on the energy absorbing member when the predicted impact force is smaller than the predetermined value, and increases the amount of the deforming action on the energy absorbing member when the predicted impact force is larger than or equal to the predetermined value.

In the second support mechanism according to the second aspect, the energy absorbing mechanism may include an energy absorbing member mounted on a side of the vehicle body, and moving relatively relative to the steering column in a longitudinal direction of the steering column, a deforming member mounted on a side of the steering column, for deforming the energy absorbing member while the energy absorbing member is moving, and an actuator that changes an amount of a deforming action of the deforming member on the energy absorbing member according to the predicted impact force. The actuator reduces the amount of the deforming action on the energy absorbing member when the predicted impact force is smaller than the predetermined value, and increases the amount of the deforming action on the energy absorbing member when the predicted impact force is larger than or equal to the predetermined value.

In the steering system supported by the first support mechanism of the second aspect, the driver may move forward and interfere with a steering wheel to move the steering column forward upon head-on collision of the vehicle. In this case, the support pin supporting the steering column relatively moves backward within the long hole of the support member with a force corresponding to the impact force. While moving, the support pin deforms the energy absorbing member to absorb the impact energy in the energy absorbing member, thereby reducing the impact force of the steering wheel against the driver.

In this case, when the predicted impact force is larger than or equal to the predetermined value e.g., when the driver does not fasten the seatbelt, the actuator increases the amount of the deforming action on the energy absorbing member. The energy absorbing member thus absorbs a large amount of energy. On the other hand, the predicted impact force is smaller than the predetermined value e.g., when the driver fastens the seatbelt, the actuator reduces the amount of the deforming action on the energy absorbing member. The energy absorbing member thus absorbs a smaller amount of energy as compared to the case where the predicted impact force is larger than or equal to the predetermined.

In the steering system supported by the second support mechanism of the second aspect as well, the driver may move forward and interfere with a steering wheel to move the steering column forward upon head-on collision of the vehicle. In this case, the deforming member mounted on the side of the steering column moves relative to the energy absorbing member mounted on the side of the vehicle body. While moving relatively, the deforming member deforms the energy absorbing member to absorb the impact energy in the energy absorbing member, thereby reducing the impact force of the steering wheel against the driver.

In this case, when the predicted impact force is larger than or equal to the predetermined value e.g., the driver does not fasten the seatbelt, the actuator increases the amount of the deforming action on the energy absorbing member. The energy absorbing member thus absorbs a large amount of energy. On the other hand, when the predicted impact force is smaller than the predetermined value e.g., the driver fastens the seatbelt, the actuator reduces the amount of the deforming action on the energy absorbing member. The energy absorbing member thus absorbs a smaller amount of energy as compared to the case where the predicted impact force is larger than or equal to the predetermined value.

The first and second support mechanisms of the second aspect are thus capable of changing the absorption amount of impact energy according to the predicted impact force. The above support mechanisms make good use of the structure of a support mechanism that is essential for supporting the steering system to a part of the vehicle body. Accordingly, the above support mechanisms can be inexpensively manufactured with a relatively simple structure without complicating the structure of the steering system. As a result, significant increase in costs can be suppressed.

In the first support mechanism of the second aspect, various actuator can be preferably used as the actuator. Hereinafter, first to sixth actuator will be described as specific examples. The first actuator includes a shearing pin that advances or retreats relative to an engaging hole in the energy absorbing member according to the predicted impact force. When the predicted impact force is lager than or equal to the predetermined value, the shearing pin advances into the engaging hole of the energy absorbing member and is engaged with the energy absorbing member. The shearing pin thus applies a shearing force to the energy absorbing member during deformation of the energy absorbing member. This enables the energy absorbing member to absorb a large amount of energy when the predicted impact force is larger than or equal to the predetermined value and to absorb a small amount of energy when the predicted impact force is smaller than the predetermined value. Note that a solenoid is preferably used to drive the shearing pin, and switching (ON/OFF) control of the solenoid is preferably conducted according to the predicted impact force.

The second actuator in the first support mechanism of the second aspect includes a deforming pin that advances or retreats relative to a slit hole in the energy absorbing member according to the predetermined value. When the predicted impact force is larger than or equal to the predetermined value, the deforming pin advances into the slit hole of the energy absorbing member so that a deforming force enlarging the slit hole of the energy absorbing member is applied during deformation of the energy absorbing member. This enables the energy absorbing member to absorb a large amount of energy when the predicted impact force is larger than or equal to the predetermined value and absorb a small amount of energy when the predicted impact force is smaller than the predetermined value. Note that a solenoid is preferably used as to drive the deforming pin, and switching (ON/OFF) control of the solenoid is preferably conducted according to the predicted impact force.

The deforming pin as the second actuator may have a tapered shape whose diameter is gradually reduced toward a tip thereof or a stepped shape whose diameter is reduced toward a tip thereof. In this case, an amount by which the deforming pin advances into the slit hole is preferably controlled according to the predicted impact force. This enables the energy absorbing member to absorb the amount of energy corresponding to the predicted impact force.

The third actuator in the first support mechanism of the second aspect includes a squeezing pin that advances or retreats relative to the energy absorbing member according to the predicted impact force. When the predicted impact force is larger than or equal to the predetermined value, the squeezing pin abuts on the energy absorbing member and applies a squeezing force to the energy absorbing member during deformation of the energy absorbing member. This enables the energy absorbing member to absorb a large amount of energy when the predicted impact force is larger than or equal to the predetermined value and absorb a small amount of energy when the predicted impact force is smaller than the predetermined value. Note that a solenoid is preferably used to drive the squeezing pin, and switching (ON/OFF) control of the solenoid is preferably conducted according to the predicted impact force.

The fourth actuator in the first support mechanism of the second aspect includes an interfering member selectively abutting on at least one of a pair of bent plates according to the predicted impact force. The interfering member abuts on at least one of the pair of bent plates so that deformation characteristics of the bent plate becomes higher in the case where the predicted impact force is larger than or equal to the predetermined value e.g., the driver does not fasten the seatbelt as compared to the case where the predicted impact force is smaller than the predetermined value e.g., the driver fastens the seatbelt. The interfering member thus applies a deforming force to the bent plate during deformation of the bent plates. This enables the energy absorbing member to absorb a large amount of energy when the predicted impact force is larger than or equal the predetermined value and absorb a small amount of energy when the predicted impact force is smaller than the predetermined value.

When the predicted impact force is smaller than the predetermined value, the interfering member of the fourth actuator may abut on one of the pair of bent plates and apply a deforming force to the bent plate. When the predicted impact force is larger than or equal to the predetermined value, the interfering member may abut on the pair of bent plates and apply the deforming force to the bent plates during deformation of the bent plates.

In the fourth actuator, the pair of bent plates may have different deformation capabilities. When the predicted impact force is smaller than the predetermined value, the interfering member may abut on the bent plate having lower deformation characteristics and apply a deforming force to the bent plate. When the predicted impact force is larger than or equal to the predetermined value, the interfering member may abut on the bent plate having higher deformation characteristics and apply a deforming force to the bent plate during deformation of the bent plates. Note that an electric motor for driving an element according to the predicted impact force is preferably used to drive the interfering member. Preferably, the electric motor selectively moves the interfering member to one of the bent plates.

The fifth actuator in the first support mechanism of the second aspect includes a tapered slide pin that changes a bent state of the energy absorbing member by advancing or retreating relative to the energy absorbing member when the predicted impact force is larger than or equal to the predetermined value e.g., when the driver does not fasten the seatbelt. When the predicted impact force is larger than or equal to the predetermined value, the energy absorbing member is bent to a large degree by interference of the slide pin. This enables the energy absorbing member to absorb a large amount of energy when the predicted impact force is larger than or equal to the predetermined value and absorb a small amount of energy when the predicted impact force is smaller than the predetermined value. Note that a solenoid for driving an element according to the predicted impact is preferably used to drive the slide pin. Switching (ON/OFF) control of the solenoid is preferably conducted according to the predicted impact force.

The sixth actuator in the first support mechanism of the second aspect includes an interfering pin that changes a bent state of the energy absorbing member by advancing or retreating relative to the energy absorbing member according to the predicted impact force. When the predicted impact force is larger than or equal to the predetermined value, the energy absorbing member is bent to a large degree by interference of the interfering pin. This enables the energy absorbing member to absorb a large amount of energy when the predicted impact force is larger than or equal to the predetermined value and absorb a small amount of energy when the predicted impact force is smaller than the predetermined value. Note that a solenoid for driving an element according to the predicted impact force is preferably used to drive the interfering pin. Switching (ON/OFF) control of the solenoid is preferably conducted according to the predicted impact force.

In the second support mechanism of the second aspect, the deforming member may be a pair of holding members that squeezes the energy absorbing member therebetween. In this case, the actuator is a driving device that changes a distance between the holding members holding and the energy absorbing members, according to the predicted impact force. This enables the energy absorbing member to absorb a large amount of energy when the predicted impact force is larger than or equal to the predetermined value and absorb a small amount of energy when the predicted impact force is smaller than the predetermined value. Note that an electric motor for driving an element according to the predicted impact force and a pair of sector gears pivotable by the electric motor are preferably used to drive the holding members. The holding members are preferably mounted in the respective sector gears.

The support mechanism according to the first and second aspects for achieving the object are thus capable of changing the absorption amount of impact energy according to the predicted impact force applied from the steering column to the driver. The support mechanisms make good use of the structure of a support mechanism that is essential for supporting the steering system to a part of the vehicle body. Accordingly, the support mechanisms can be inexpensively manufactured with a relatively simple structure without complicating the structure of the steering system. As a result, increase in costs can be significantly suppressed.

The support mechanism according to the first and second aspects are thus capable of changing the absorption amount of impact energy according to the predicted impact force applied from the steering column to the driver. The support mechanisms make good use of the structure of a support mechanism that is essential for supporting the steering system to a part of the vehicle body. Accordingly, the support mechanisms can be inexpensively manufactured with a relatively simple structure without complicating the structure of the steering system. As a result, increase in costs can be significantly suppressed.

The ECU of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A support mechanism of a steering system, comprising:
   a support portion that supports a steering column to a part of a vehicle body, the steering column supporting a steering shaft so that the steering shaft is rotatable in a circumferential direction; and
   an energy absorbing mechanism mounted in the support portion on a side of at least one of the steering column and the vehicle body, and capable of changing an energy absorption amount, wherein:
      the energy absorption amount of the energy absorbing mechanism is reduced when a driver fastens a seatbelt and is increased when the driver does not fasten the seatbelt,
      the energy absorbing mechanism comprises:
         a support member fixed to the steering column,
         a support pin which extends through a longitudinal long hole in the support member and which is attached to a part of the vehicle body to support the steering column to the vehicle body through the support member,
         an energy absorbing member mounted in the support member, and capable of being deformed by the support pin when the support pin moves relative to the bug hole within the long hole, and
         an actuator that changes an amount of a deforming action on the energy absorbing member, wherein the actuator reduces the amount of a deforming action on the energy absorbing member when the driver of the vehicle fastens the seatbelt and increases the amount of the deforming action on the energy absorbing member when the driver of the vehicle does not fasten the seatbelt,
      the energy absorbing member includes a pair of bent plates arranged in parallel with each other, the actuator includes an interfering member selectively abutting on at least one of the pair of bent plates according to whether the driver fastens the seatbelt and the interfering member abuts on at least one of the pair of bent plates so that a deformation characteristic of the bent plate becomes higher in a case where the driver does not fasten the seatbelt as compared to a case where the driver fastens the seatbelt, and the interfering member applies a deforming force to the bent plate during deformation of the bent plates, and
      the pair of bent plates have different deformation capabilities, wherein when the driver fastens the seatbelt, the interfering member abuts on the bent plate having lower deformation characteristics and applies a deforming force to the bent plate and when the driver does not fasten the seatbelt, the interfering member abuts on the bent plate having higher deformation characteristics and applies a deforming force to the bent plate during deformation of the bent plates.

2. A support mechanism of a steering system, comprising:
   a support portion that supports a steering column to a part of a vehicle body, the steering column supporting a steering shaft so that the steering shaft is rotatable in a circumferential direction; and
   an energy absorbing mechanism mounted in the support portion on a side of at least one of the steering column and the vehicle body, and capable of changing an energy absorption amount, wherein:
      the energy absorption amount of the energy absorbing mechanism is reduced when a driver fastens a seatbelt and is increased when the driver does not fasten the seatbelt,
      the energy absorbing mechanism comprises:
         an energy absorbing member mounted on a side of the vehicle body and moving relative to the steering column in a longitudinal direction of the steering column,
         a deforming member mounted on a side of the steering column, that deforms the energy absorbing member while the deforming member is moving relative to the energy absorbing member, and
         an actuator that changes an amount of a deforming action of the deforming member on the energy absorbing member according to whether the driver of the vehicle fastens the seatbelt, wherein the actuator reduces the amount of the deforming action on the energy absorbing member when the driver fastens the seatbelt, and increases the amount of the deforming action on the energy absorbing member when the driver does not fasten the seatbelt, and the deforming member is a pair of holding members that squeezes the energy absorbing member therebetween and the actuator that changes a distance between the holding members holding the energy absorbing members therebetween, according to whether the driver fastens the seatbelt.

3. A support mechanism of a steering system, comprising:

a support portion that supports a steering column to a part of a vehicle body, the steering column supporting a steering shaft so that the steering shaft is rotatable in a circumferential direction; and an energy absorbing mechanism mounted in the support portion on a side of at least one of the steering column and the vehicle body, and capable of changing an energy absorption amount, wherein:

the energy absorption amount of the energy absorbing mechanism is reduced when a driver fastens a seatbelt and is increased when the driver does not fasten the seatbelt, the energy absorbing mechanism comprises:

a support member fixed to the steering column, a support pin which extends through a longitudinal long hole in the support member, and which is attached to a part of the vehicle body to support the steering column to the vehicle body through the support member, and first and second energy absorbing members mounted in the support member, and capable of being deformed by the support pin when the support pin moves relative to the long hole within the long hole, wherein the support pin deforms the first energy absorbing member when the driver fastens the seatbelt and deforms the first and second energy absorbing members simultaneously when the driver does not fasten the seatbelt, and the first energy absorbing member is a bent plate whose one end is fixed to the support member, and which longitudinally extends and is bent behind the support pin extending through the long hole and the second energy absorbing member is a support member having the long hole, the support mechanism further comprising:

a cam located in a large-width portion of the long hole and capable of moving within a small-width portion of the long hole, the large-width portion being located at a base end of the long hole, and a driving device that rotates the cam so as to selectively change a width of the cam facing the small-width portion of the long hole to a value larger or smaller than a width of the small-width portion of the long hole, wherein when the width of the cam facing the small-width portion of the long hole is smaller than that of the small-width portion, the support pin stretches the bent plate while moving backward within the long hole of the support member and when the width of the cam facing the small-width portion of the long hole is larger than that of the small-width portion, the support pin stretches the bent plate and successively deforms a side edge of the small-width portion of the long hole by using the cam while moving backward within the long hole of the support member.

4. The support mechanism of the steering system according to claim 3, wherein when the driver fastens the seatbelt, the driving device operates so that the width of the cam facing the small-width portion of the long hole becomes smaller than that of the small-width portion, and when the driver does not fasten the seatbelt, the driving device operates so that the width of the cam facing the small-width portion of the long hole becomes larger than that of the small-width portion.

5. A support mechanism of a steering system, comprising:

a support portion that supports a steering column to a part of a vehicle body, the steering column supporting a steering shaft so that the steering shaft is rotatable in a circumferential direction; and an energy absorbing mechanism mounted in the support portion on a side of at least one of the steering column and the vehicle body, and capable of changing an energy absorption amount, wherein when a driver of the vehicle does not fasten a seatbelt, the energy absorption amount of the energy absorbing mechanism is increased when a seated position of the driver is ahead of a preset position and is decreased when the seated position of the driver is in the preset position.

6. The support mechanism of the steering system according to claim 5, wherein the energy absorbing mechanism comprises:

a support member fixed to the steering column;

a support pin which extends through a longitudinal long hole in the support member, and which is attached to a part of the vehicle body to support the steering column to the vehicle body through the support member;

an energy absorbing member mounted in the support member, and capable of being deformed by the support pin when the support pin moves relative to the long hole within the long hole; and an actuator that changes an amount of a deforming action on the energy absorbing member, wherein the actuator reduces the amount of the deforming action on the energy absorbing member when the seated position of the driver is in the preset position, and increases the amount of the deforming action on the energy absorbing member when the seated position of the driver is ahead of the preset position.

7. The support mechanism of the steering system according to claim 5, wherein the energy absorbing mechanism comprises:

an energy absorbing member mounted on a side of the vehicle body, and moving relatively in a longitudinal direction of the steering column;

a deforming member mounted on a side of the steering column, that deforms the energy absorbing member while the energy absorbing member is moving relative to the steering column; and an actuator that changes an amount of a deforming action of the deforming member on the energy absorbing member according to the seated position of the driver, wherein the actuator reduces the amount of the deforming action on the energy absorbing member when the seated position of the driver is in the preset position, and increases the amount of the deforming action on the energy absorbing member when the seated position of the driver is ahead of the preset position.

8. The support mechanism of the steering system according to claim 5, wherein the energy absorbing mechanism comprises:

a support member fixed to the steering column;

a support pin which extends through a longitudinal long hole in the support member, and which is attached to a part of the vehicle body to support the steering column to the vehicle body through the support member; and first and second energy absorbing members mounted in the support member, and capable of being deformed by the support pin when the support pin moves relative to the long hole within the long hole, wherein the support pin deforms the first energy absorbing member when the seated position of the driver is in the preset position, and deforms the first and second energy absorbing members simultaneously when the seated position of the driver is ahead of the preset position.

9. The support mechanism of the steering system according to claim 5, wherein an airbag is mounted in a steering wheel attached to the steering shaft.

10. An impact absorbing method for a steering system having an energy absorbing mechanism capable of changing an energy absorption amount, comprising:

determining whether a seated position of a driver of a vehicle is ahead of a preset position;

determining whether the driver has fastened a seatbelt; and increasing the energy absorption amount of the energy absorbing mechanism, from the energy absorption amount when the seated position of the driver is in the preset position, when the seated position of the driver is ahead of the preset position and when the driver does not fasten the seatbelt.

11. An impact absorption method for a steering system having an energy absorbing mechanism capable of changing an energy absorption amount, comprising:

determining whether a seated position of a driver of a vehicle is ahead of a preset position; and increasing the energy absorption amount of the energy absorbing mechanism, from the energy absorption amount when the seated position of the driver is in the preset position, when the seated position of the driver is ahead of the preset position.

12. A support mechanism of a steering system, comprising:

a first detecting device that detects a seated position of a driver of a vehicle;

a second detecting device that detects whether the driver fastens a seatbelt; and an energy absorbing mechanism that absorbs energy applied to a steering column and is capable of changing an amount of absorbed energy, wherein when the seated position of the driver is ahead of a preset position and the driver does not fasten the seatbelt, the energy absorbing mechanism increases the amount of the absorbed energy from the amount of the absorbed energy when the seated position of the driver is in the preset position.

13. A support mechanism of a steering system, comprising:

a first detecting device that detects a seated position of a driver of a vehicle; and an energy absorbing mechanism that absorbs energy applied to a steering column and is capable of changing an amount of absorbed energy, wherein the energy absorbing mechanism changes the amount of the absorbed energy based on the detected seating position and when the seated position of the driver is ahead of a preset position, the energy absorbing mechanism increases the amount of the absorbed energy from the amount of the absorbed energy when the seated position of the driver is in the preset position.

14. The support mechanism according to claim 13, further comprising:

a second detecting device that detects whether the driver fastens a seatbelt, wherein the energy absorbing mechanism changes the amount of the absorbed energy based on the detected seating position and whether the driver fastens the seatbelt.

* * * * *